(12) United States Patent
Zhang

(10) Patent No.: US 9,517,510 B2
(45) Date of Patent: Dec. 13, 2016

(54) QUICK CHANGE POWER TOOL CHUCK

(75) Inventor: Xinhui Zhang, Hangzhou (CN)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 789 days.

(21) Appl. No.: 13/488,510

(22) Filed: Jun. 5, 2012

(65) Prior Publication Data

US 2013/0320637 A1    Dec. 5, 2013

(51) Int. Cl.
| | |
|---|---|
| *B23B 31/107* | (2006.01) |
| *B23B 31/06* | (2006.01) |
| *B23B 31/16* | (2006.01) |

(52) U.S. Cl.
CPC ............ *B23B 31/06* (2013.01); *B23B 31/16* (2013.01); *B23B 31/1078* (2013.01); *B23B 2260/022* (2013.01); *B23B 2260/136* (2013.01); *Y10S 279/906* (2013.01); *Y10T 279/17179* (2015.01); *Y10T 279/17743* (2015.01); *Y10T 279/1913* (2015.01); *Y10T 279/3481* (2015.01)

(58) Field of Classification Search
CPC ....... B23B 31/06; B23B 31/16; B23B 31/1078
USPC ................. 279/28, 74, 155, 906, 29, 30, 75, 904,279/140, 60–73
See application file for complete search history.

(56) References Cited

U.S. PATENT DOCUMENTS

| | | | | |
|---|---|---|---|---|
| 1,112,349 A | * | 9/1914 | Barnes ................... | B23B 31/02 279/74 |
| 3,633,931 A | | 1/1972 | Bilz | |
| 3,658,351 A | * | 4/1972 | Benjamin et al. ............... | 279/75 |
| 3,735,993 A | * | 5/1973 | Seibert .............. | 279/75 |
| 3,788,658 A | | 1/1974 | Benjamin et al. | |
| 4,063,488 A | * | 12/1977 | Kagerer ........................ | 409/233 |
| 4,366,733 A | * | 1/1983 | Colvin ........................... | 81/128 |
| 4,378,714 A | * | 4/1983 | Colvin ........................... | 81/128 |
| 6,325,393 B1 | | 12/2001 | Chen et al. | |

(Continued)

FOREIGN PATENT DOCUMENTS

| | | |
|---|---|---|
| DE | 2157799 A1 | 6/1973 |
| DE | 3341252 A1 | 5/1985 |

(Continued)

OTHER PUBLICATIONS

International Search Report and Written Opinion in corresponding International Application (i.e., PCT/US2013/044102), mailed Sep. 20, 2013 (12 pages).

*Primary Examiner* — Eric A Gates
*Assistant Examiner* — Chwen-Wei Su
(74) *Attorney, Agent, or Firm* — Maginot Moore & Beck LLP

(57) ABSTRACT

A power tool chuck includes at least one claw portion movable from a first position spaced apart from a centerline of the chuck toward a second position located closer to the centerline. The power tool chuck also includes a collar configured such that as the collar moves from a third position to a fourth position, the at least one claw portion is forced from the first position toward the second position. The power tool chuck also includes a locking member movable between a fifth position whereat the locking member locks the collar in the third position and a sixth position whereat the locking member does not lock the collar. The power tool chuck also includes a button movable between a seventh position whereat the locking member is forced into the fifth position and an eighth position whereat the locking member is free to move into the sixth position.

20 Claims, 19 Drawing Sheets

(56) References Cited

U.S. PATENT DOCUMENTS

| | | |
|---|---|---|
| 6,457,916 B2 | 10/2002 | Wienhold |
| 6,843,484 B2 | 1/2005 | Schroeder |
| 6,920,810 B1 | 7/2005 | Thompson et al. |
| 2002/0067008 A1* | 6/2002 | Frenzel et al. ............... 279/19.4 |
| 2008/0190251 A1 | 8/2008 | Huang |

FOREIGN PATENT DOCUMENTS

| | | |
|---|---|---|
| DE | 4222703 A1 | 1/1994 |
| DE | 202006006157 U1 | 10/2006 |

\* cited by examiner

QUICK CHANGE POWER TOOL CHUCK

FIELD

This patent relates generally to chucks and, more specifically, to quick change chucks for power tools.

BACKGROUND

Chucks are used to secure interchangeable bits or heads into a machine. Chucks may secure bits or heads axially and radially to limit unwanted movement during use. Jaw assemblies are one example of a chuck configuration which can be adjusted radially between open and closed positions to secure bits radially. Moving jaws toward the center of the chuck tightens them around the bit or head, securing them for use. Moving the jaws away from the center of the chuck loosens their grip on the bit or head allowing the bit or head to be removed and changed.

To be efficient, the interchange of bits or heads in the chuck must be quick and simple without compromising the secure attachment. Chucks having jaw assemblies may be adjusted by turning an outer housing which engages threads and tightens or loosens the grip of the jaws. This may be time consuming, and if the housing is not turned enough, the bit or head may not be sufficiently secured in the chuck. Alternatively, chucks having jaw assemblies may be adjusted by turning a key in a threaded hole which adjusts each jaw. Again, this may be time consuming and may fail to sufficiently secure the bit or head in the chuck.

Given the above discussion, it would be advantageous to provide an improved apparatus for adjusting a chuck to secure or release a bit or head. It would be advantageous if this apparatus did not require turning a key or a housing so that the chuck could be operated more quickly. It would also be advantageous if this apparatus sufficiently secured the bit or head in the chuck so that a user would be less likely to insufficiently secure the bit or head in the chuck.

SUMMARY

In accordance with one embodiment of the disclosure, a power tool chuck includes at least one claw portion movable from a first position spaced apart from a centerline of the chuck toward a second position located closer to the centerline. The power tool chuck also includes a collar configured to move such that as the collar moves from a third position to a fourth position, the at least one claw portion is forced from the first position toward the second position. The power tool chuck also includes a locking member movable between a fifth position whereat the locking member locks the collar in the third position and a sixth position whereat the locking member does not lock the collar in the third position. The power chuck also includes a button aligned with the centerline and movable between a seventh position whereat the locking member is forced into the fifth position and an eighth position whereat the locking member is free to move into the sixth position.

In accordance with another embodiment of the disclosure, a power tool chuck includes a claw assembly including at least one claw portion radially movable with respect to a centerline of the chuck. The power tool chuck also includes a collar assembly operably contacting the at least one claw portion and axially movable along the centerline. The power tool chuck also includes a locking assembly having a first configuration wherein the collar assembly is locked at a first location and a second configuration whereat the collar assembly is not locked at the first location. The lock assembly includes a button positioned within and accessible through the claw assembly.

The above described features and advantages, as well as others, will become more readily apparent to those of ordinary skill in the art by reference to the following detailed description and accompanying drawings. While it would be desirable to provide an article that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
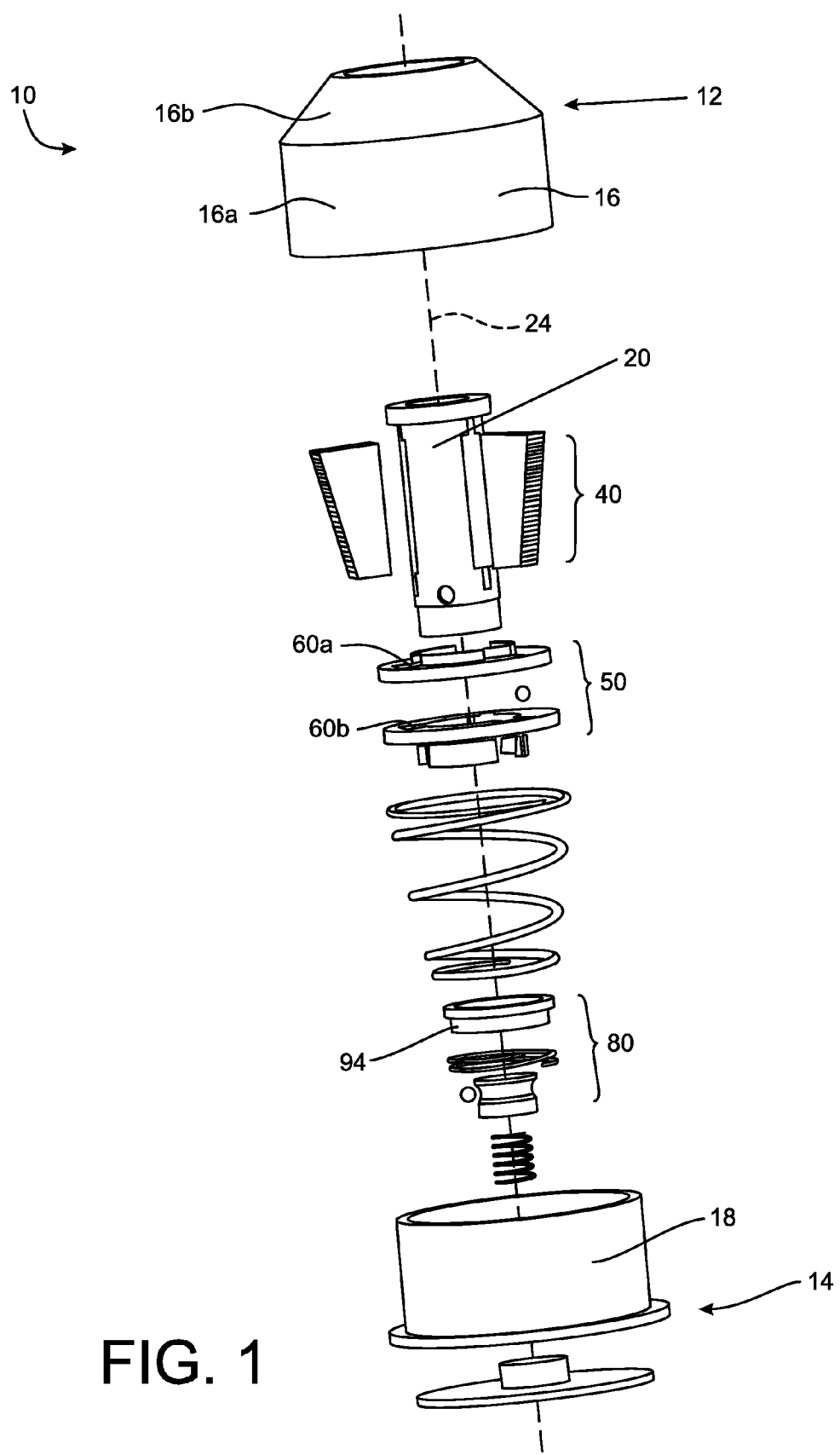
FIG. 1 depicts an exploded perspective view of the quick change chuck.

For the purposes of promoting an understanding of the principles of the invention, reference will now be made to the embodiments illustrated in the drawings and described in the following written specification. It is understood that no limitation to the scope of the invention is thereby intended.

It is further understood that the present invention includes any alterations and modifications to the illustrated embodiments and includes further applications of the principles of the invention as would normally occur to one skilled in the art to which this invention pertains.

FIG. 1 depicts an exploded perspective view of a power tool chuck 10 including a top portion 12 and a bottom portion 14. The power tool chuck 10 further defines a centerline 24, extending axially through the center of the power tool chuck 10 through the top portion 12 and the bottom portion 14, and is substantially radially symmetrical about the centerline 24. For the purposes of this application, relative position with be given with reference to the orientation shown in FIG. 1, the top being the top portion 12 and the bottom being the bottom portion 14. The term "axial" is used to refer to direction parallel to the centerline 24. The term "upward" is used to refer to axial orientation toward the top portion 12 and the term "downward" is used to refer to axial orientation toward the bottom portion 14 of the power tool chuck 10. The term "radial" is used to refer to direction perpendicular to the centerline 24. The term "inward" is used to refer to radial orientation toward the centerline 24 and the term "outward" is used to refer to radial orientation away from the centerline 24.

The power tool chuck 10 includes an outer housing 16, an inner housing 18, a chuck body 20, a claw assembly 40, a collar assembly 50 and a locking assembly 80. The outer housing 16 is hollow and includes a substantially cylindrically shaped portion 16a as well as a tapered portion 16b. The inner housing 18 is hollow and substantially cylindrically shaped and configured to closely fit within the cylindrically shaped portion 16a of the outer housing 16. The inner housing 18 fits within the cylindrically shaped portion 16a of the outer housing 16 such that the outer housing 16 can slide axially over the inner housing 18. Together the outer housing 16 and inner housing 18 form a cavity that encapsulates the other components of the power tool chuck 10.

Figure 2:
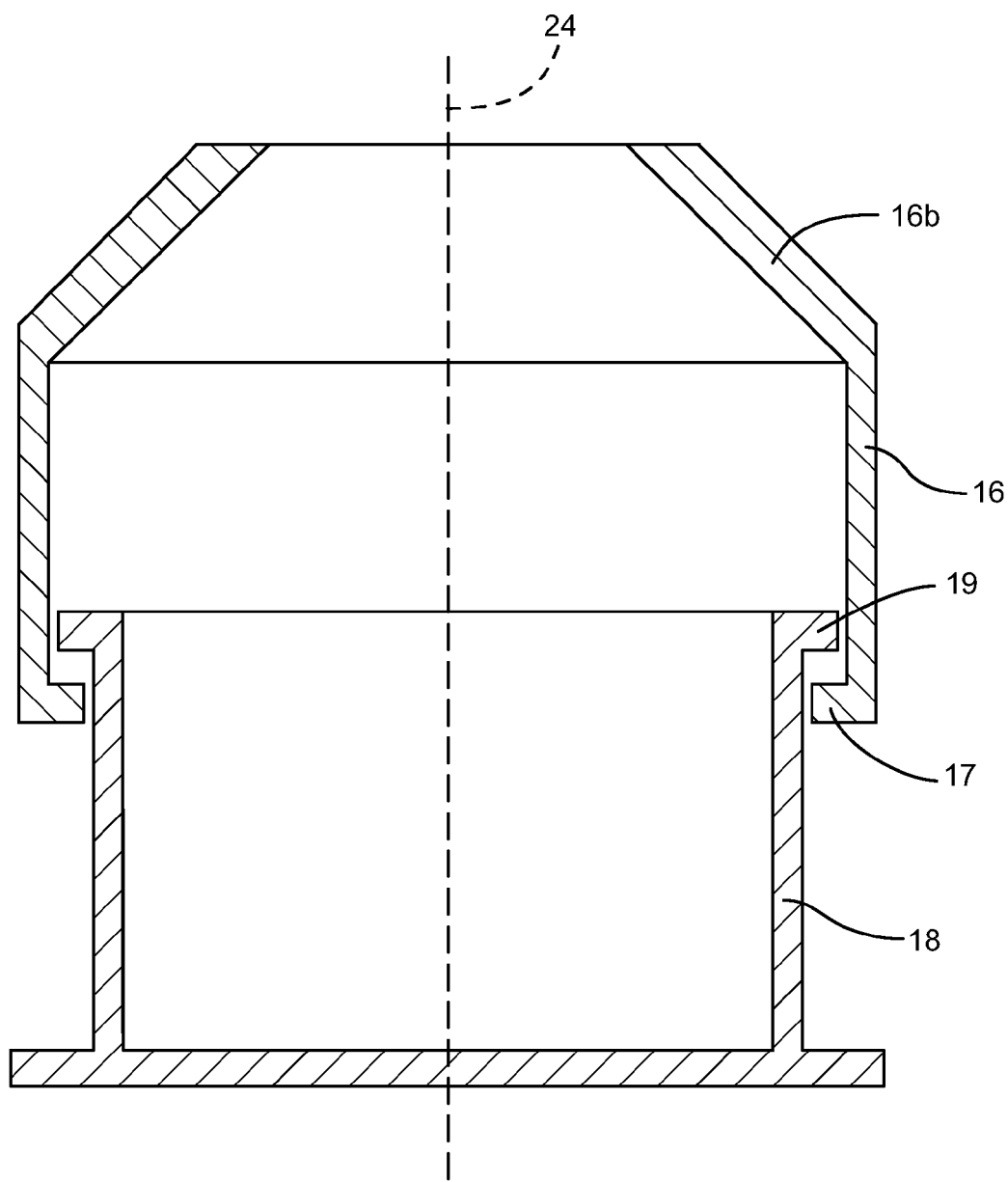
FIG. 2 depicts a side cross sectional view of the housing of the quick change chuck of FIG. 1.

As shown in FIG. 2, the outer housing 16 includes a tab 17 extending inwardly and the inner housing 18 includes a tab 19 extending outwardly. The tabs 17, 19 are configured to contact each other to prevent the outer housing 16 from sliding off the inner housing 18 by sliding too far upwardly. The outer housing 16 can slide downwardly over the inner housing 18 until the inner housing 18 contacts the tapered portion 16b of the outer housing 16. The outer housing 16 can slide axially upwardly over the inner housing 18 until the tab 17 contacts the tab 19. Thus, the axial sliding movement of the outer housing 16 relative to the inner housing 18 is limited in both the upward and downward directions.

Figure 3:
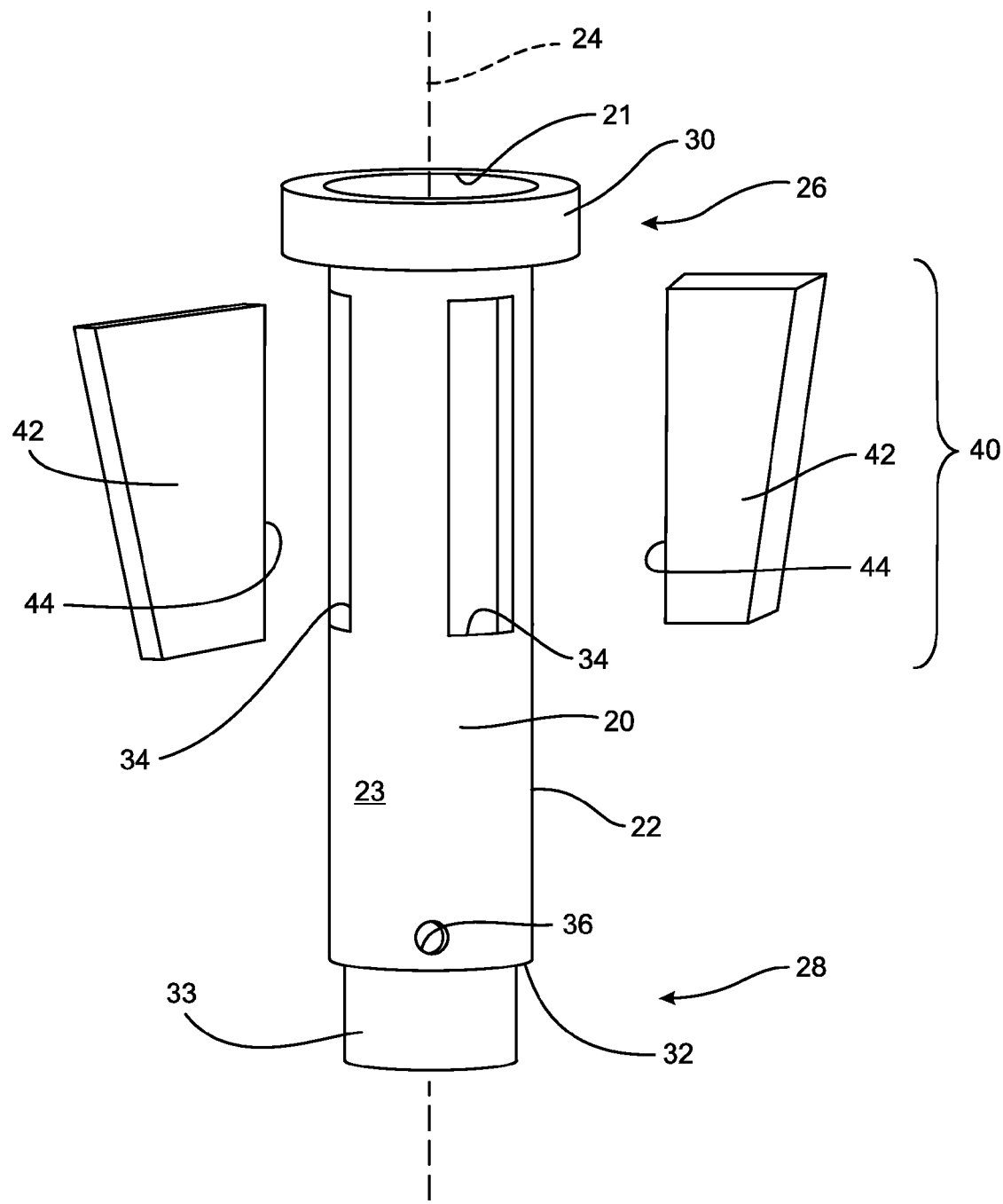
FIG. 3 depicts an exploded perspective view of the chuck body and claw assembly of the quick change chuck of FIG. 1.
Figure 9:
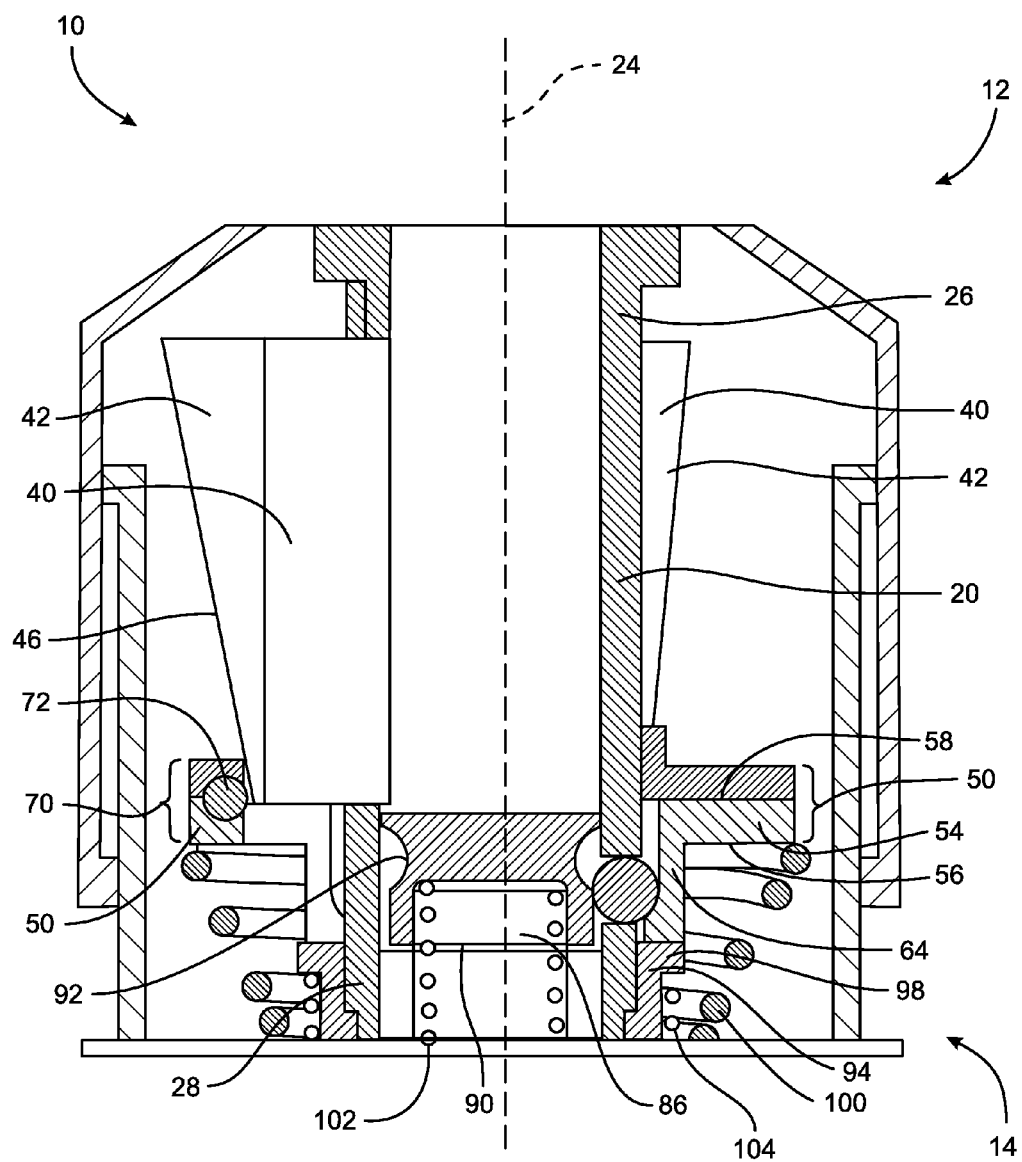
FIG. 9 depicts a side cross sectional view of the quick change chuck of FIG. 1 in an unloaded configuration.
Figure 10:
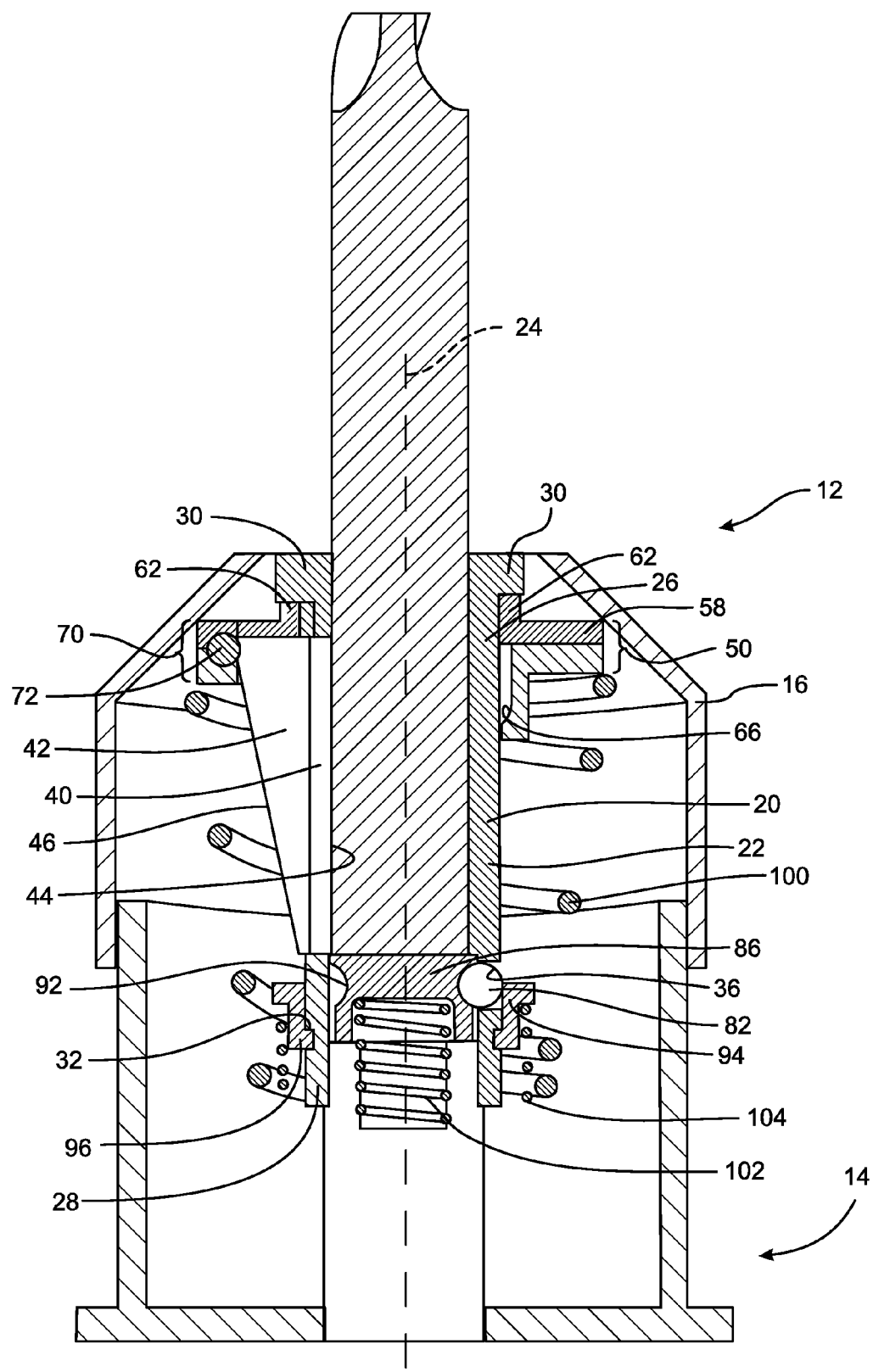
FIG. 10 depicts a side cross sectional view of the quick change chuck of FIG. 1 in a loaded configuration.

With reference to FIG. 3, the chuck body 20 has a bore 21 defined by a wall 22. The chuck body 20 is substantially radially symmetrical about the centerline 24. The chuck body 20 includes an upper portion 26 and a lower portion 28. When the power tool chuck 10 is assembled, as shown in FIGS. 9 and 10, the upper portion 26 of the chuck body 20 is positioned near the top portion 12 of the power tool chuck 10. The lower portion 28 of the chuck body 20 is positioned near the bottom portion 14 of the power tool chuck 10. Returning to FIG. 3, the wall 22 of the chuck body 20 defines an external surface 23 facing outwardly. A flange 30 extends outwardly from the external surface 23 away from the centerline 24 such that the chuck body 20 is wider at the flange 30 than the rest of the external surface 23. The external surface 23 also includes a ledge 32 at the lower portion 28 of the chuck body. The ledge 32 extends inwardly from the external surface 23 such that the chuck body 20 is narrower at a narrow portion 33 below the ledge 32 than at the rest of the external surface 23.

The wall 22 of the chuck body 20 includes a number of slots 34 positioned at intervals around the chuck body 20. The slots 34 are positioned in the upper portion 26 of the chuck body 20. The slots 34 extend through the wall 22 to the bore 21 and are axially oriented along the chuck body 20 such that they are substantially parallel to the centerline 24. The wall 22 of the chuck body 20 also includes a sidewall opening 36 in the form of a circular hole extending through the wall 22 to the bore 21 of the chuck body 20. The sidewall opening 36 is positioned in the lower portion 28 of the chuck body 20.

The claw assembly 40 includes at least one claw portion 42 and preferably includes a plurality of claw portions 42. The claw portions 42 are positioned equidistantly radially about the centerline 24. The claw portions 42 are configured to be received within and movable at least partially through the slots 34 in the wall 22 of the chuck body 20 such that the claw portions 42 are radially movable with respect to the centerline 24 of the chuck body 20.

Figure 4:
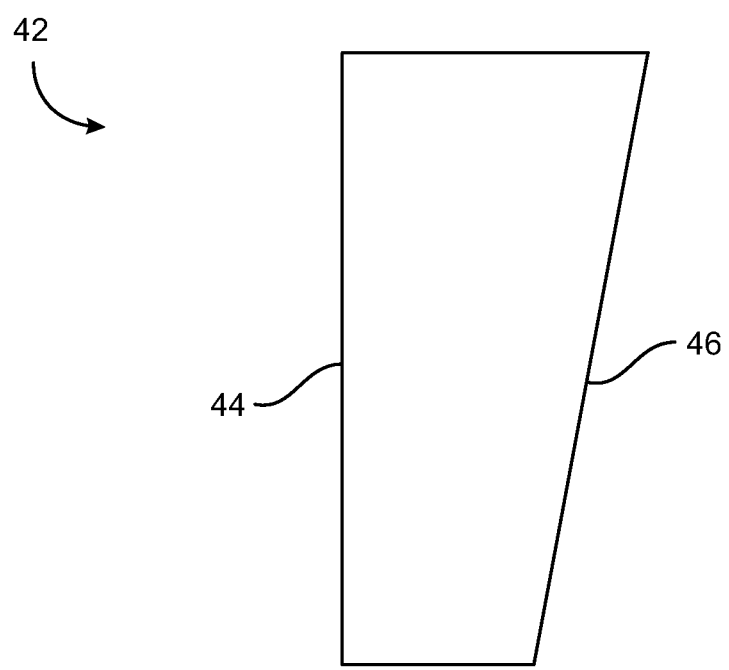
FIG. 4 depicts a side plan view of a claw portion of the quick change chuck of FIG. 1.
Figure 7:
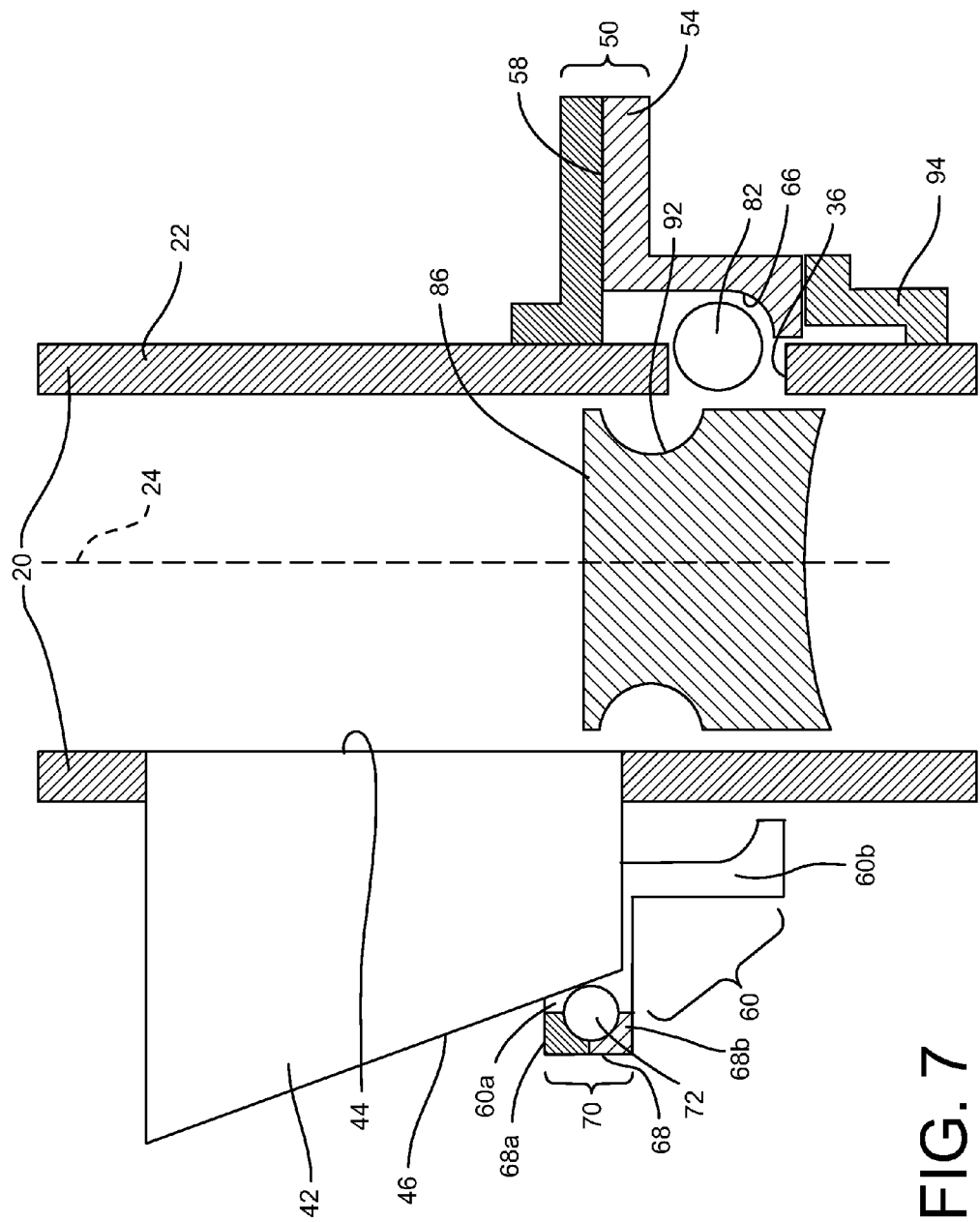
FIG. 7 depicts a side cross sectional view of some of the components of the quick change chuck of FIG. 1 in an unloaded configuration.
Figure 8:
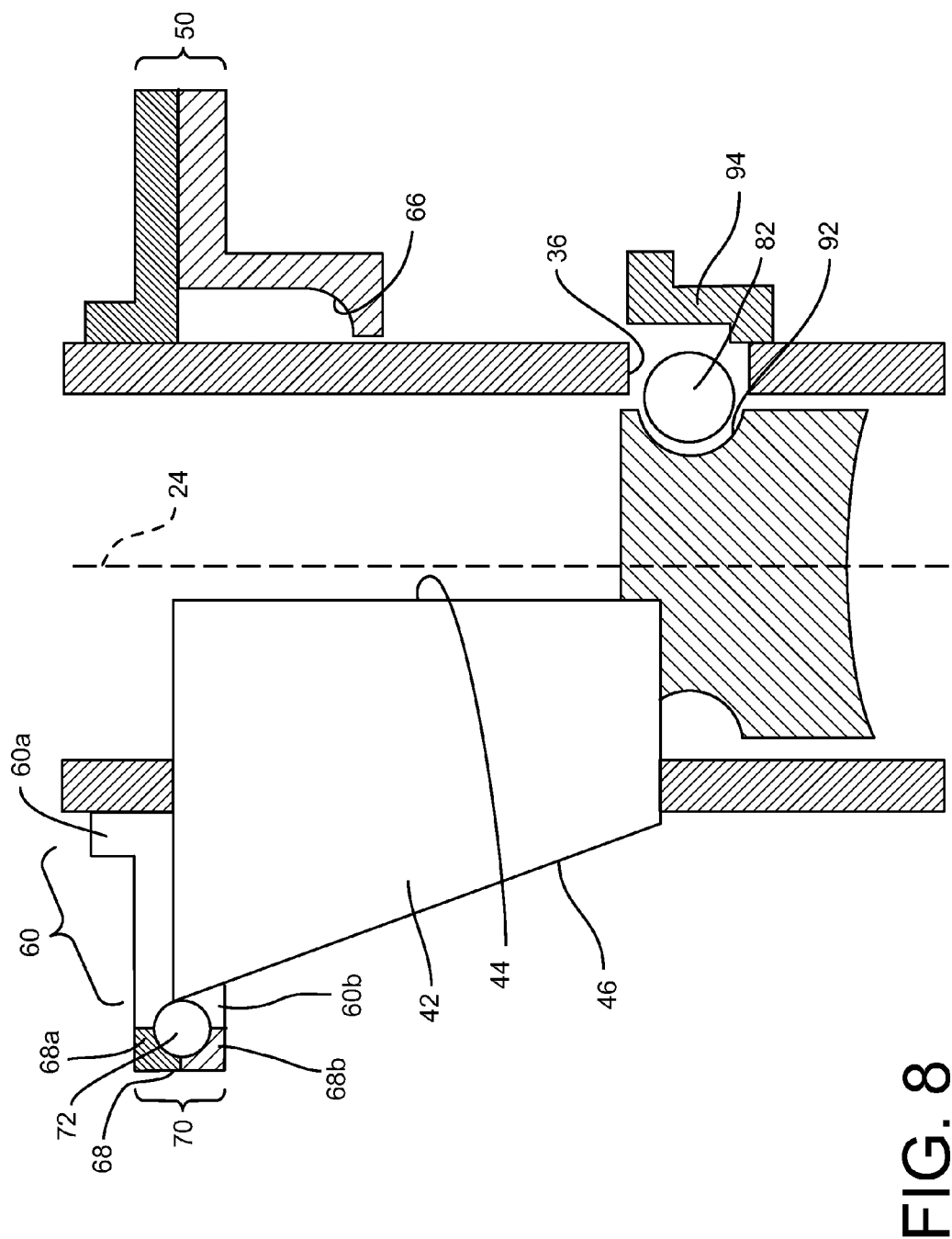
FIG. 8 depicts a side cross sectional view of some of the components of the quick change chuck of FIG. 1 in a loaded configuration.

As shown in FIG. 4, the claw portions 42 include inner surfaces 44 generally parallel to the centerline 24 (when assembled as shown in FIGS. 9 and 10). When the claw portions 42 are inserted in the slots 34, as shown in FIGS. 7 and 8, the inner surfaces 44 face inwardly. The claw portions 42 also include outer surfaces 46 opposite the inner surfaces 44. When the claw portions 42 are inserted in the slots 34, as shown in FIGS. 7 and 8, the outer surfaces 46 extend upwardly and outwardly such that the outer surfaces 46 are closer to the centerline 24 in the lower portion 28 and farther from the centerline 24 in the upper portion 26 of the chuck body 20.

Figure 5:
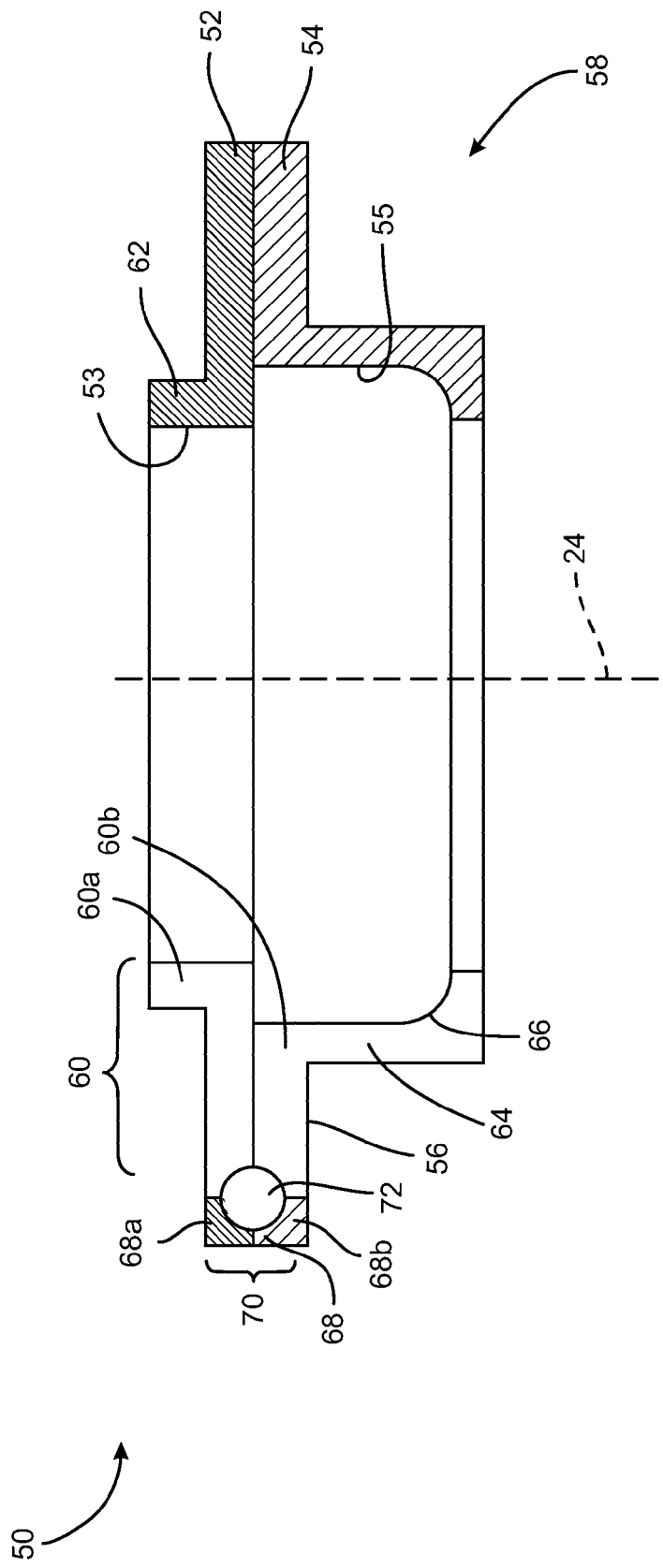
FIG. 5 depicts a side cross sectional view of the collar assembly of the quick change chuck of FIG. 1.

Shown in FIG. 5, the collar assembly 50 includes a top collar portion 52, a bottom collar portion 54 and a ball 72. The top collar portion 52 and the bottom collar portion 54 are both substantially ring shaped and configured to fit around the chuck body 20 (as best shown in FIGS. 1, 9 and 10). The top collar portion 52 and the bottom collar portion 54 are also configured to fit together to form a collar 58 that is substantially ring shaped and configured to fit around the chuck body 20 (as best shown in FIGS. 1, 9 and 10). The collar assembly 50 is axially movable with respect to the centerline 24 such that it moves between a lower position closer to the bottom portion 14 and an upper position closer to the top portion 12 of the power tool chuck 10.

Returning to FIG. 5, the top collar portion 52 defines an inner surface 53 which faces inwardly toward the chuck body 20. The top collar portion 52 includes recesses 60a (also shown in FIG. 1) formed on the inner surface 53. The recesses 60a are configured to align with the claw portions 42 of the claw assembly 40 as the claw assembly 40 protrudes outwardly through the slots 34 in the chuck body 20. Thus, the recesses 60a are configured to receive a portion of the claw portion 42 and the top collar portion 52 is configured to slide over the chuck body 20 even as the claw portions 42 protrude outwardly from the chuck body 20. The top collar portion 52 also includes ribs 62 which extend upwardly. As shown in FIG. 10, the ribs 62 are configured to contact the flange 30 on the chuck body 20 when the collar 58 is in the upper position.

Referring again to FIG. 5, the bottom collar portion 54 defines an inner surface 55 facing the chuck body 20. The bottom collar portion 54 includes recesses 60b (best shown in FIG. 1) formed on the inner surface 55. The recesses 60b are configured to align with the claw portions 42 of the claw assembly 40 as the claw assembly protrudes outwardly through the slots 34 in the chuck body 20. Thus, the recesses 60*b* are configured to receive a portion of the claw portion 42 and the bottom collar portion 54 is configured to slide over the chuck body 20 even as the claw portions 42 protrude outwardly from the chuck body 20. The bottom collar portion 54 also includes legs 64 extending downwardly from a bottom surface 56. The legs 64 include a lip 66 formed on the inner surface 55. The lip 66 is formed as a curve open inwardly and upwardly.

The top collar portion 52 includes ball retaining areas 68*a* positioned on the outward ends of the recesses 60*a* and the bottom collar portion 54 includes ball retaining areas 68*b* positioned on the outward ends of the recesses 60*b*. When the top collar portion 52 and the bottom collar portion 54 are fitted together to form the collar 58, the recesses 60*a* and 60*b* form recesses 60 and the ball retaining areas 68*a* and 68*b* form ball retainer cavities 70 in the collar 58. When assembled, as shown in FIGS. 7 and 8, the ball retainer cavities 70 are aligned with the outer surfaces 46 of the claw portions 42 that are extending into the recesses 60. The ball retainer cavities 70 are configured to retain the balls 72 such that the balls 72 contact the outer surfaces 46 of the claw portions 42.

Figure 6:
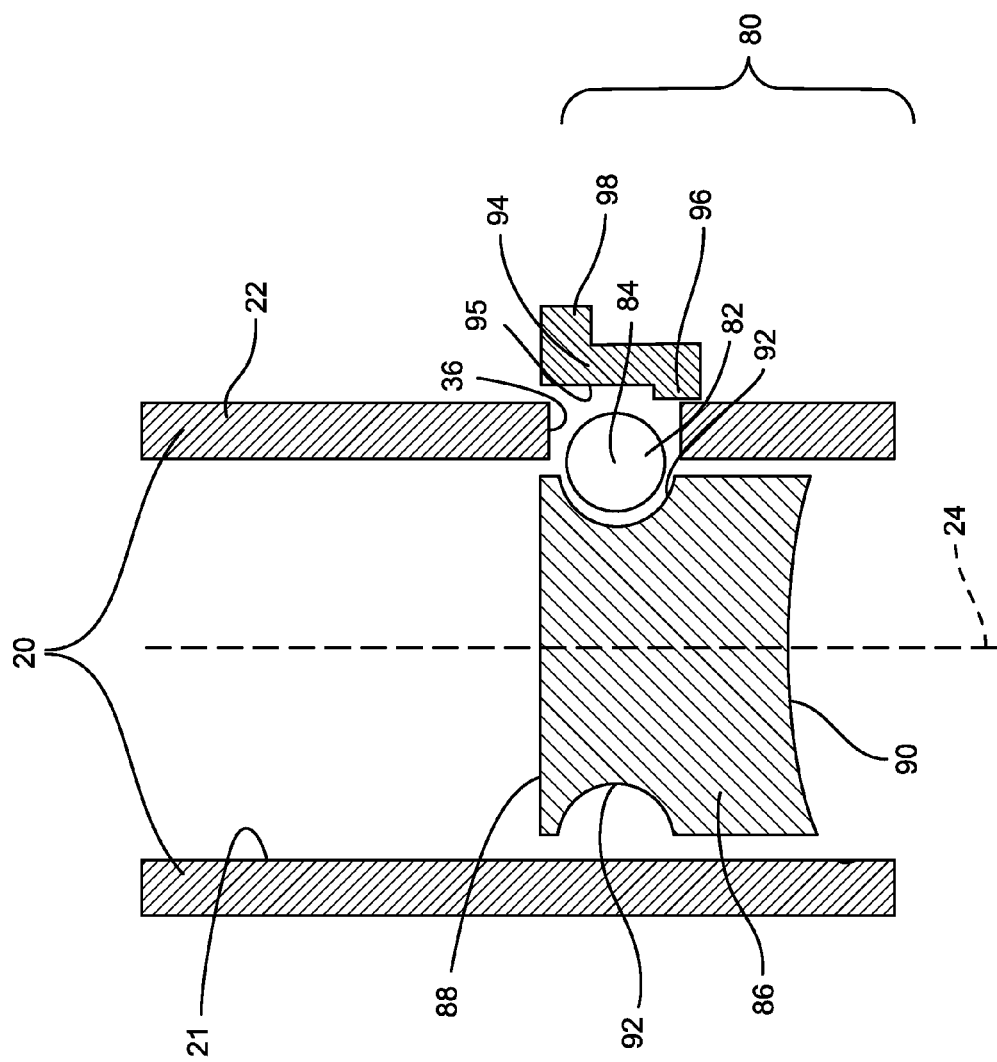
FIG. 6 depicts a side cross sectional view of the locking assembly of the quick change chuck of FIG. 1.

As shown in FIG. 6, the locking assembly 80 includes a locking member 82, an actuation member 86 and a locking member holder 94. The locking member 82 is positioned at least partially in the sidewall opening 36 of the chuck body 20. The actuation member 86 is positioned within and accessible through the bore 21 of the chuck body 20. The locking member holder 94 is positioned outside the chuck body 20.

The locking member 82 is configured to fit through the sidewall opening 36 defined in the wall 22 of the chuck body 20. The locking member 82 is sized and positioned, however, such that the locking member 82 cannot pass entirely through the wall 22 of the chuck body 20. Instead, a portion 84 of the locking member 82 is always within the sidewall opening 36. The locking member 82 is radially movable with respect to the centerline 24 between a position that is spaced apart from the centerline 24 and a position that is nearer to the centerline 24 as described more fully below.

The actuation member 86 may be in any desired form which will resist but not prevent movement resulting in the release of the locking member 82 from engagement with the lip 66. In this embodiment, the actuation member 86 is configured in the form of a button and includes a top surface 88, a depression 90 and a trench 92. The top surface 88 faces upwardly and the actuation member 86 is operated by applying pressure to the top surface 88. The depression 90 is opposite the top surface 88 and faces downwardly. The trench 92 opens outwardly and faces away from the centerline 24 of the chuck body 20. The trench 92 may be in any desired form which will receive a portion of the locking member 82. In this embodiment, the trench 92 is configured in the form of a concavity which extends inwardly into the actuation member 86 and continues all the way around the actuation member 86.

The locking member holder 94 is substantially ring shaped and has an inner surface 95 configured to fit closely around the chuck body 20. FIG. 1 shows that the locking member holder 94 is substantially ring shaped, however, for simplicity, only the portion of the locking member holder 94 which interacts with the locking member 82 is shown in FIGS. 6-8. The locking member holder 94 defines a projection 96 which extends from the inner surface 95. The locking member holder 94 is located below the collar assembly 50 such that it is closer to the bottom portion 14 of the power tool chuck 10. The locking member holder 94 includes a flange 98 extending radially outwardly from the locking member holder 94.

As shown in FIGS. 9 and 10, the power tool chuck 10 further includes a collar biasing member 100 configured to bias the collar assembly 50 upwardly toward the top portion 12 of the power tool chuck 10. The collar biasing member 100 is provided in the form of a spring located between the collar assembly 50 and the bottom portion 14 of the power tool chuck 10. The collar biasing member 100 is positioned around the chuck body 20 and between the bottom portion 14 and the collar assembly 50 such that it contacts the bottom portion 14 of the power tool chuck 10 and the bottom surface 56 of the bottom collar portion 54 outside the legs 64. The collar biasing member 100 applies upward force on the collar 58 and biases the collar assembly 50 upwardly toward the top portion 12 of the power tool chuck 10.

The power tool chuck 10 further includes a button biasing member 102 configured to bias the actuation member 86 upwardly toward the top portion 12 of the power tool chuck 10. The button biasing member 102 is provided in the form of a spring located between the actuation member 86 and the bottom portion 14 of the power tool chuck 10. The button biasing member 102 is positioned within the actuation member 86 between the bottom portion 14 and the actuation member 86 such that it contacts the bottom portion 14 of the power tool chuck 10 and the depression 90 in the actuation member 86. The button biasing member 102 applies upward force on the actuation member 86 to bias the actuation member 86 upwardly toward the top portion 12 of the power tool chuck 10.

The power tool chuck 10 further includes a holder biasing member 104 configured to bias the locking member holder 94 upwardly toward the top portion 12 of the power tool chuck 10. The holder biasing member 104 is provided in the form of a spring located between the locking member holder 94 and the bottom portion 14 of the power tool chuck 10. The holder biasing member 104 is positioned around the chuck body 20 but within the collar biasing member 100 between the bottom portion 14 and the locking member holder 94 such that it contacts the bottom portion 14 and the flange 98 on the locking member holder 94. The holder biasing member 104 applies upward force on the locking member holder 94 to bias the locking member holder 94 upwardly toward the top portion 12 of the power tool chuck 10.

FIG. 9 is a cross sectional view of the power tool chuck 10 in an unloaded configuration, wherein the power tool chuck 10 does not have a tool or drill bit inserted into the chuck body 20. When the power tool chuck 10 is in an unloaded configuration, the button biasing member 102 is expanded upwardly and, thus, the actuation member 86 is in an upper position away from the bottom portion 14 of the power tool chuck 10. As shown in FIG. 7, the upper position of the actuation member 86 causes the trench 92 to be more upwardly positioned than the sidewall opening 36 in the wall 22 of the chuck body 20. Because the trench 92 is not aligned with the sidewall opening 36, the locking member 82 is not able to enter the trench 92 and is positioned such that it engages the lip 66 of the bottom collar portion 54. The engagement of the locking member 82 with the lip 66 prevents the collar 58 from moving upwardly.

Returning to FIG. 9, because the locking member 82 prevents the collar 58 from moving upwardly, the collar 58 is in a lower position and the collar biasing member 100 is compressed between the bottom portion 14 of the power tool chuck 10 and the bottom surface 56 of the bottom collar portion 54. Additionally, because the collar 58 is in the lower position, the locking member holder 94 is forced downwardly, compressing the holder biasing spring 104 between the bottom portion 14 of the power tool chuck 10 and the flange 98 of the locking member holder 94.

As noted above, the collar assembly 50 is positioned and configured to move between a lower position (shown in FIG. 9) and an upper position (shown in FIG. 10). The collar assembly 50 operably contacts the claw portions 42 as it moves axially along the chuck body 20 such that when the collar assembly moves upwardly, the balls 72 retained in the ball retainer cavities 70 contact the outer surfaces 46 of the claw portions 42. Because the outer surfaces 46 of the claw portions 42 extend upwardly and outwardly, and because the collar 58 of the collar assembly 50 has a fixed inner diameter, the collar assembly 50 forces the claw portions 42 inwardly from a position that is farther from the centerline 24 (shown in FIG. 7) toward a position that is nearer to the centerline 24 (shown in FIG. 8) as the collar assembly moves upwardly.

Referring again to FIG. 7, because the collar 58 is positioned near the bottom portion 14 when the power tool chuck 10 is in the unloaded configuration, the balls 72 in the ball retainer cavities 70 of the collar assembly 50 are positioned at the narrowest part of the claw portions 42 and thus do not force the claw portions 42 inwardly toward the centerline 24. Accordingly, the position of the collar 58 when the power tool chuck 10 is in the unloaded configuration allows the claw portions 42 of the claw assembly 40 to move outwardly away from the centerline 24.

The power tool chuck 10 transforms from the unloaded configuration to the loaded configuration (shown in FIGS. 8 and 10) upon insertion of a tool or drill bit into the chuck body 20 of the power tool chuck 10. As shown in FIG. 10, the tool or drill bit is inserted downwardly into the chuck body 20 until it contacts the actuation member 86 near the bottom portion 14 of the power tool chuck 10. The tool or drill bit applies pressure to the actuation member 86 sufficient to overcome the force of the button biasing spring 102 such that the actuation member 86 is forced downwardly toward the bottom portion 14 of the power tool chuck 10 and the trench 92 becomes aligned with the sidewall opening 36 in the wall 22 of the chuck body 20.

The alignment of the trench 92 with the sidewall opening 36 allows the locking member 82 to move inwardly toward the centerline 24. The inward movement of the locking member 82 is aided by the shape of the lip 66 in the collar 58. The inward movement of the locking member 82 disengages the lip 66 and allows the collar 58 to move upwardly due to the force applied to the bottom surface 56 of the bottom collar portion 54 by the collar biasing member 100. The upward movement of the collar 58 is limited by contact between the ribs 62, which extend upwardly from the collar 58, and the flange 30 of the chuck body 20.

Upward movement of the collar assembly 50 frees the locking member holder 94 such that the holder biasing member 104 forces the locking member holder 94 upwardly toward the top portion 12 of the power tool chuck 10. The upward movement of the locking member holder 94 is limited by contact between the projection 96 on the locking member holder 94 and the ledge 32 of the chuck body 20.

Upward movement of the collar assembly 50 also forces the claw portions 42 inwardly through the slots 34 in the wall 22 of the chuck body 20 as the balls 72 contact the outer surfaces 46 of the claw portions 42 and the collar assembly 50 is forced upwardly along the external surface 23 of the chuck body 20 by the collar biasing member 100. The inward movement of the claw portions 42 is limited by contact between the inner surface 44 of the claw portion 42 and the drill or tool bit.

Once the inner surfaces 44 of the claw portions 42 contact the drill or tool bit, the power tool chuck 10 is in the loaded configuration. The collar biasing member 100 maintains pressure on the claw assembly 40 to retain the drill or tool bit within the chuck body 20, and the holder biasing member 104 maintains pressure on the locking member holder 94 to retain the locking member 82 within the trench 92. Therefore, the collar biasing member 100 and the holder biasing member 104 keep the power tool chuck 10 in the loaded configuration.

To remove the drill or tool bit from the power tool chuck 10, a user must apply downward force to the top portion 12 of the power tool chuck 10. The force applied to the top portion 12 will move the outer housing 16 downwardly relative to the chuck body 20. The outer housing 16 will contact the collar assembly 50. The downward force applied to the top portion 12 must be sufficient to overcome the upward forces of the collar biasing member 100 and the holder biasing member 104. Once the downward force applied to the top portion 12 overcomes the upward force of the collar biasing member 100, the collar assembly 50 will move downwardly toward the bottom portion 14 of the power tool chuck 10. The downward movement of the collar assembly 50 frees the claw portions 42 to move outwardly away from the centerline 24. Once the collar assembly 50 contacts the locking member holder 94, the downward force applied to the top portion 12 must overcome the upward force of the holder biasing member 104 as well as that of the collar biasing member 100. Forcing the collar assembly 50 downwardly such that the locking member holder 94 is forced past the sidewall opening 36 in the wall 22 of the chuck body 20 allows the lip 66 to align with the sidewall opening 36 in the wall 22 of the chuck body 20. Alignment of the lip 66 with the sidewall opening 36 allows the locking member 82 to move radially outwardly into the lip 66 and out of the trench 92. The upward force applied on the actuation member 86 by the button biasing member 102 forces the actuation member 86 upwardly toward the top portion 12 of the power tool chuck 10 and aids movement of the locking member 82 out of the trench 92. The drill or tool bit is removed from the chuck body 20 and the power tool chuck 10 is thus returned to the unloaded configuration.

FIGS. 11-19 depict various views and features of a quick change power tool chuck 110. The power tool chuck 110 is similar to the power tool chuck 10, including a chuck body 120, a claw assembly 140, a collar assembly 150 and a locking assembly 180. The chuck body 120, the claw assembly 140, the collar assembly 150 and the locking assembly 180 are configured and arranged to relate to each other in substantially the same way as in power tool chuck 10. In contrast to power tool chuck 10, however, the power tool chuck 110 includes an upper housing 116, a middle housing 117, a lower housing 118, a leaf spring 141, threaded portions 106, 132 and a lock washer 108. As explained below, these elements of power tool chuck 110 enable the power tool chuck 110 to clamp around a tool bit inserted into the chuck body 120.

Figure 11:
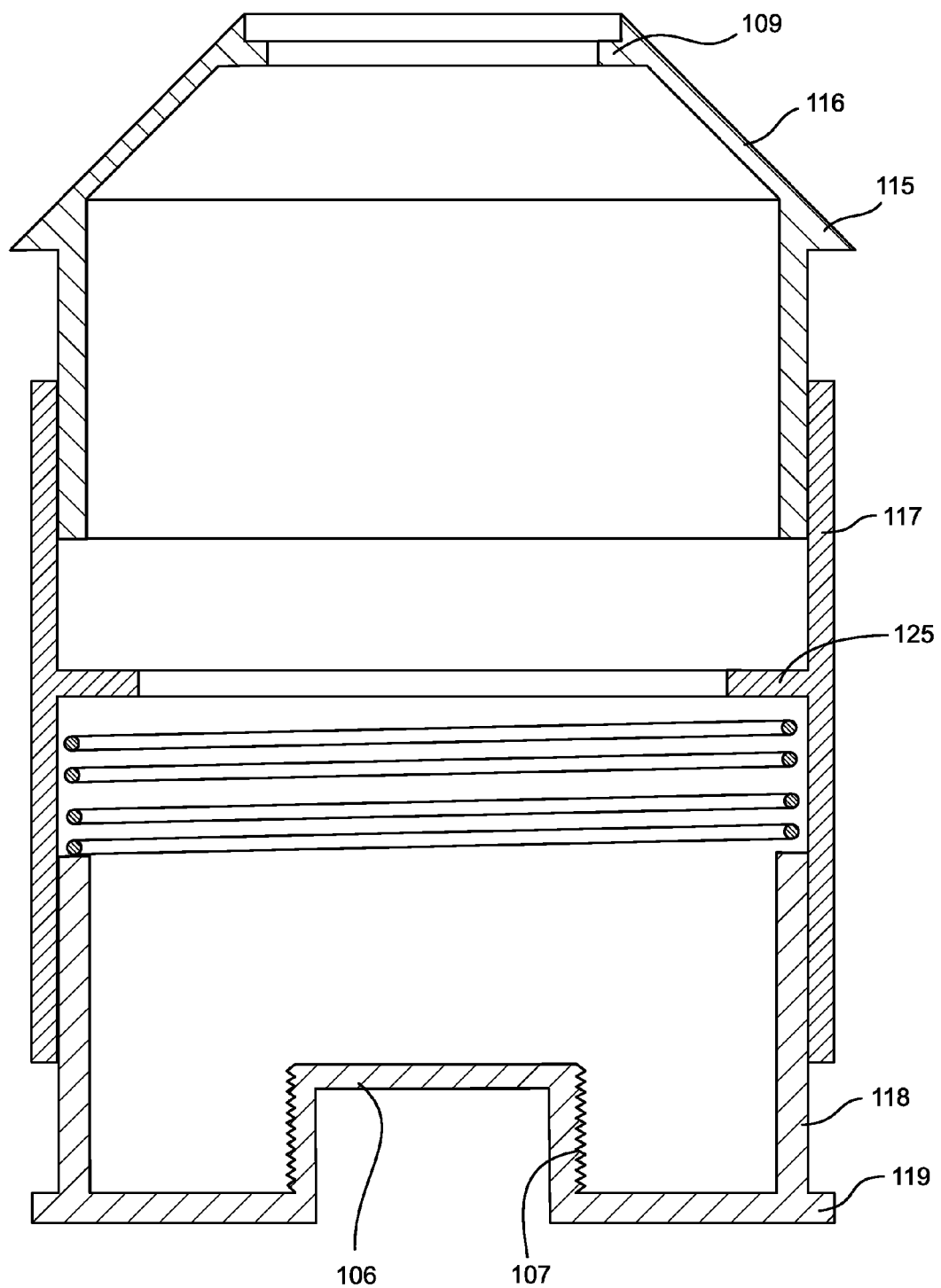
FIG. 11 depicts a side cross sectional view of the housing of an alternative quick change chuck.
Figure 18:
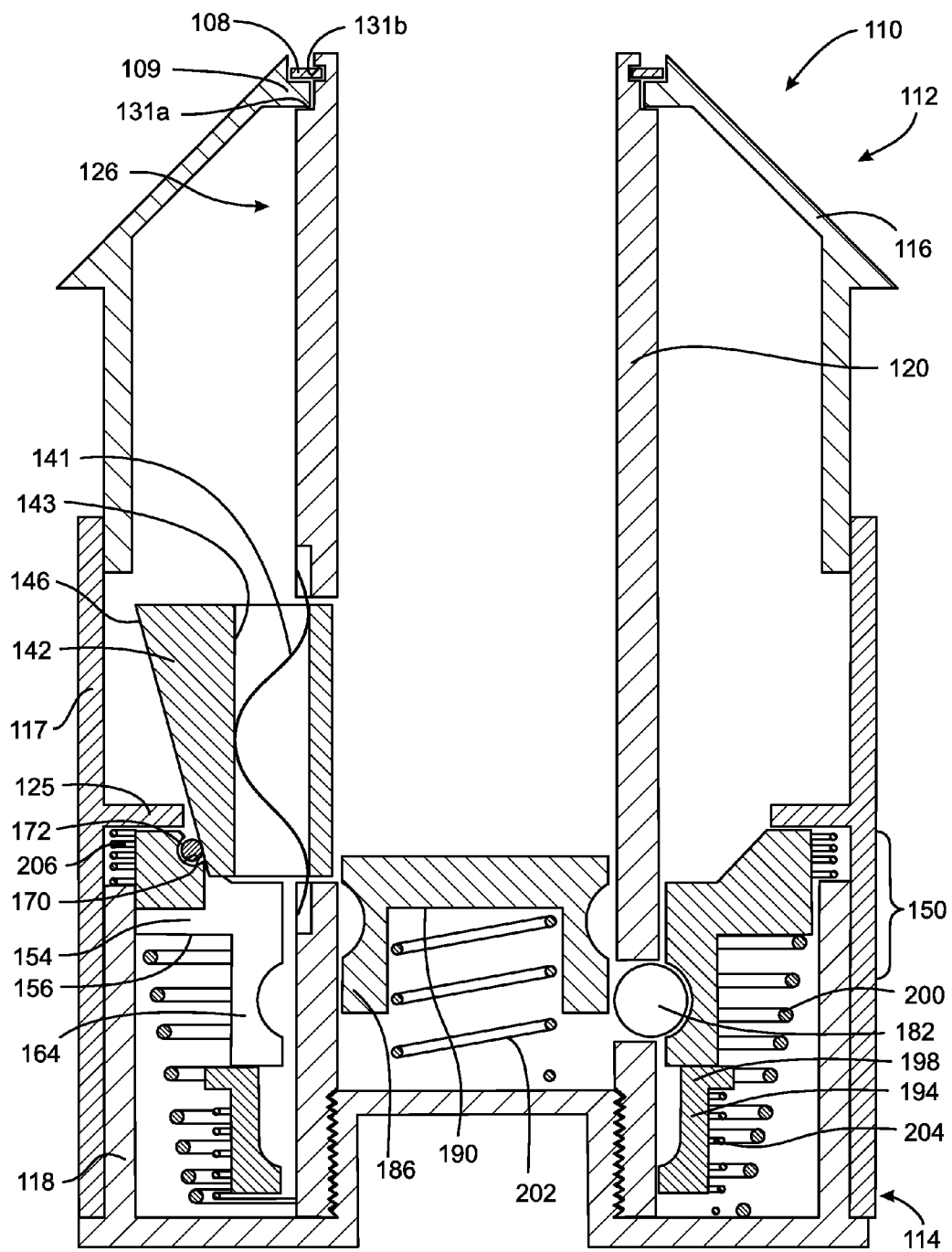
FIG. 18 depicts a side cross sectional view of the quick change chuck of FIG. 11 in an unloaded configuration.
Figure 19:
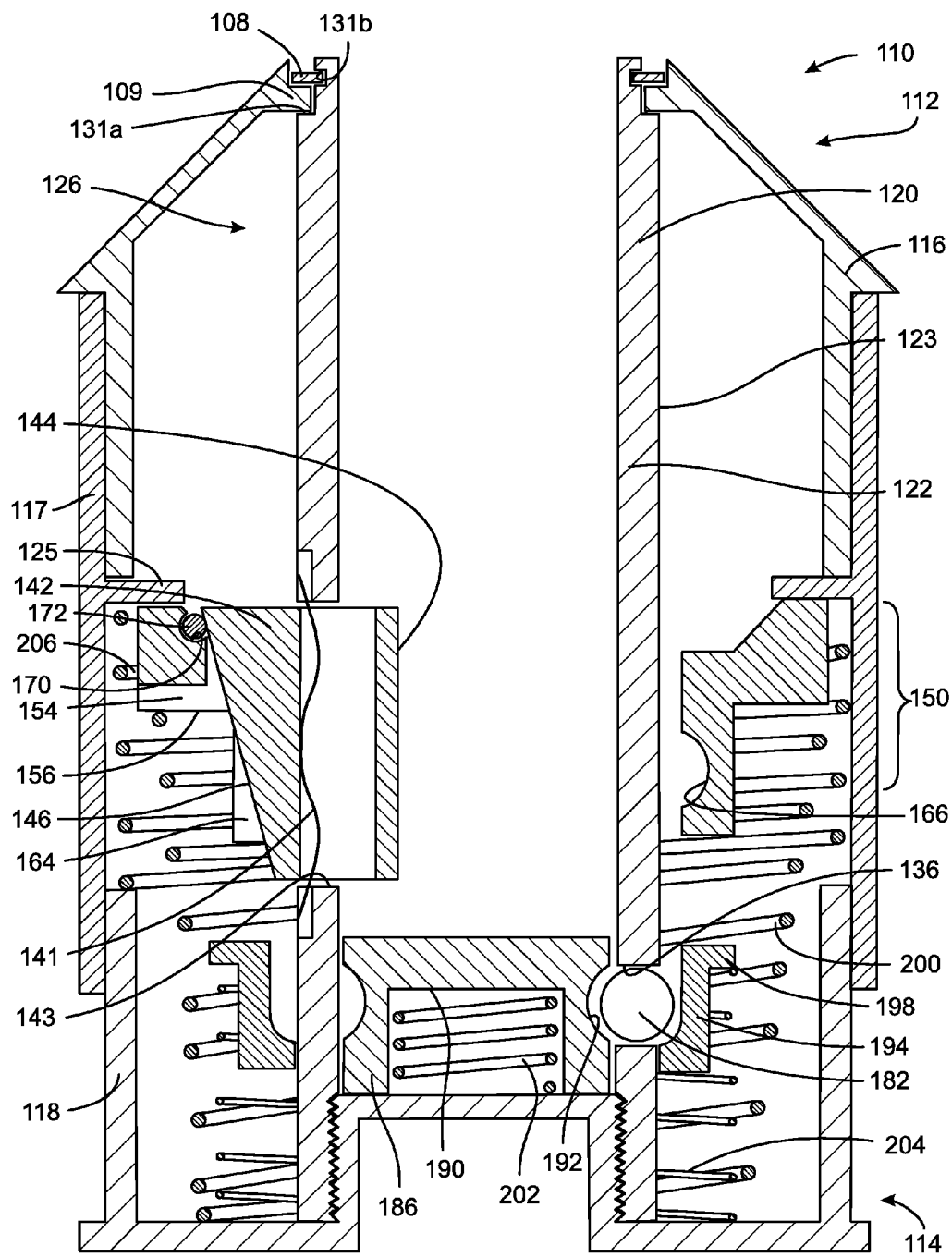
FIG. 19 depicts a side cross sectional view of the quick change chuck of FIG. 11 in a loaded configuration.

FIG. 11 is a cross-sectional view of the upper housing 116, middle housing 117 and lower housing 118 of the power tool chuck 110. The upper housing 116, middle housing 117 and lower housing 118 are all hollow and substantially cylindrically shaped. The upper housing 116 and lower housing 118 have substantially similar diameters. The middle housing 117 has a slightly larger diameter and is configured to closely fit outside the upper housing 116 and lower housing 118. The cylindrical shape of the middle housing 117 is substantially concentric with the upper housing 116 and the lower housing 118. When configured as shown in FIGS. 18 and 19, the upper housing 116 and lower housing 118 remain fixed relative to one another. The middle housing 117 is configured to slide axially such that it moves upwardly and downwardly relative to the upper housing 116 and lower housing 118. Together, the upper housing 116, middle housing 117 and lower housing 118 form a cavity that encapsulates the other components of the power tool chuck 110.

Returning to FIG. 11, the upper housing 116 includes a tab 115 extending outwardly from approximately the middle of the upper housing. The lower housing 118 includes a tab 119 extending outwardly from the bottom portion 114 of the power tool chuck 110. The tab 115 is configured to contact the middle housing 117 to limit how far the middle housing 117 is able to slide upwardly. The tab 119 is configured to contact the middle housing 117 to limit how far the middle housing 117 is able to slide downwardly. The middle housing 117 can slide axially upwardly over the upper housing 116 and lower housing 118 until the middle housing 117 contacts the tab 115 of the upper housing 116. The middle housing 117 can slide axially downwardly over the upper housing 116 and lower housing 118 until the middle housing 117 contacts the tab 119 of the lower housing 118. Thus, the axial sliding movement of the middle housing 117 relative to the upper housing 116 and the lower housing 118 is limited in both the upward and downward directions.

The upper housing 116 further includes an inward projection 109 extending into the cavity created by the upper housing 116, the middle housing 117 and the lower housing 118. The inward projection 109 projects from the top portion 112 of the power tool chuck 110.

The middle housing 117 further includes an internal brim 125 extending into the cavity created by the upper housing 116, the middle housing 117 and the lower housing 118. The internal brim 125 extends inwardly from approximately the middle of the middle housing 117 and extends around the internal circumference of the middle housing 117

The lower housing 118 further includes an upward projection 106 extending into the cavity created by the upper housing 116, the middle housing 117 and the lower housing 118. The upward projection 106 is substantially cylindrically shaped and the side of the upward projection 106 is threaded to form a lower housing threaded portion 107.

Figure 12:
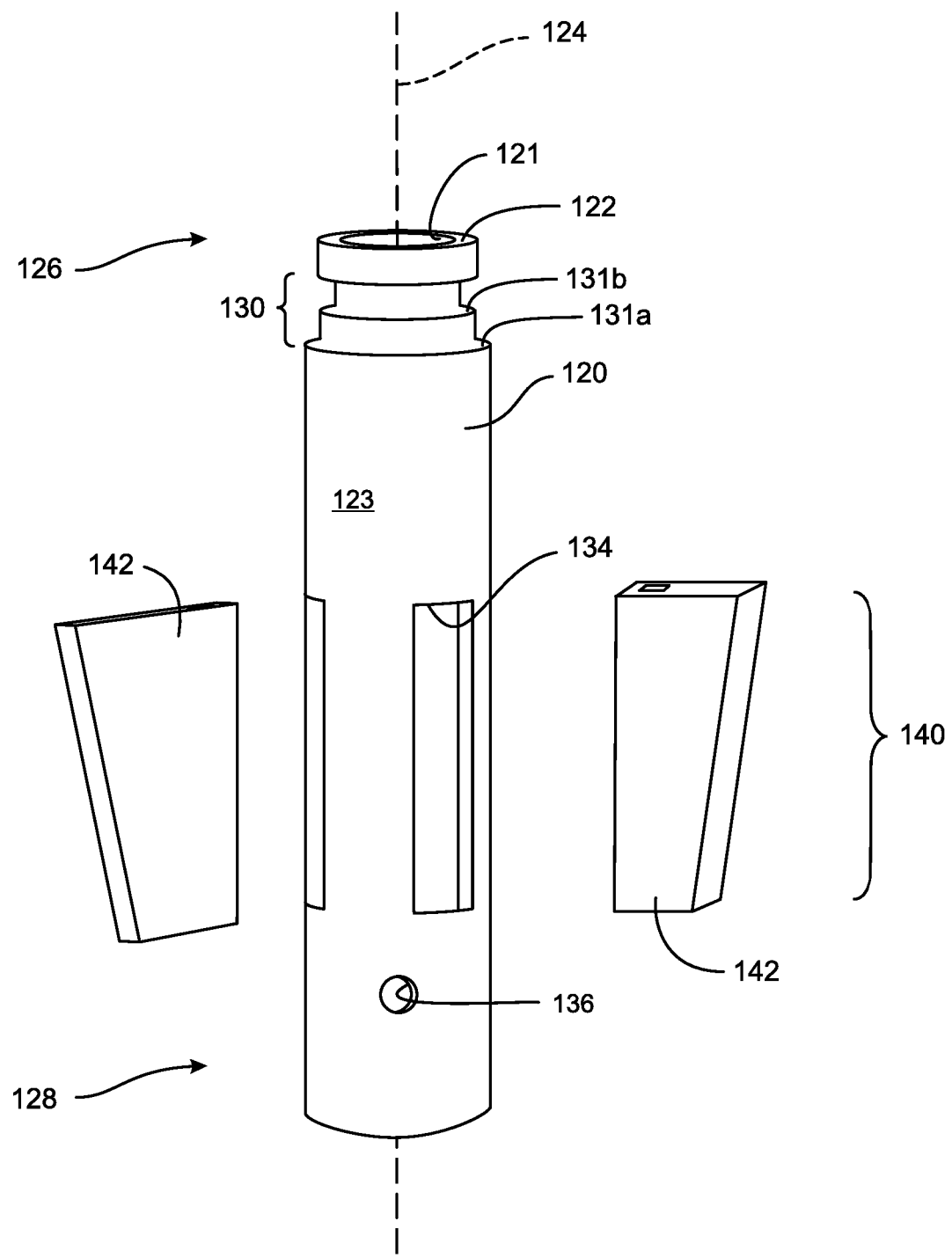
FIG. 12 depicts an exploded perspective view of the chuck body and claw assembly of the quick change chuck of FIG. 11.

With reference to FIG. 12, the chuck body 120 has a bore 121 defined by a wall 122. The chuck body 120 is substantially radially symmetrical about the centerline 124. The chuck body 120 includes an upper portion 126 and a lower portion 128. When the power tool chuck 110 is assembled, as shown in FIGS. 18 and 19, the upper portion 126 of the chuck body 120 is positioned near the top portion 112 of the power tool chuck 110. Returning to FIG. 12, the wall 122 of the chuck body 120 defines an external surface 123 facing outwardly. A cut-out 130 extends inwardly from the external surface 123 toward the centerline 124 such that the chuck body 120 is narrower at the cut-out 130 than the rest of the external surface 123. The cut-out 130 includes a first indentation 131a and a second indentation 131b. The first indentation 131a is located at a lower position on the chuck body 120 than the second indentation 131b. The second indentation 131b extends further inwardly from the external surface 123 than the first indentation 131a. The first indentation 131a is sized and configured such that, when the power tool chuck 110 is assembled as shown in FIGS. 18 and 19, the inward projection 109 of the upper housing 116 will rest on the first indentation 131a. Thus, the first indentation 131a prevents the upper housing 116 from moving downwardly relative to the chuck body 120 when the power tool chuck 110 is assembled as shown in FIGS. 18 and 19.

Returning to FIG. 12, the wall 122 of the chuck body 120 includes a number of slots 134 positioned at intervals around the chuck body 120. The slots 134 are positioned between the upper portion 126 and the lower portion 128 of the chuck body 120. The slots 134 extend through the wall 122 to the bore 121 and are axially oriented along the chuck body 120 such that they are substantially parallel to the centerline 124. The wall 122 of the chuck body 120 also includes internal notches 133 (shown in FIGS. 16 and 17) positioned above and below each of the slots 134. The internal notches 133 are fully contained within the wall 122 and do not extend to either of the external surface 123 or the bore 121 of the chuck body 120.

Figure 16:
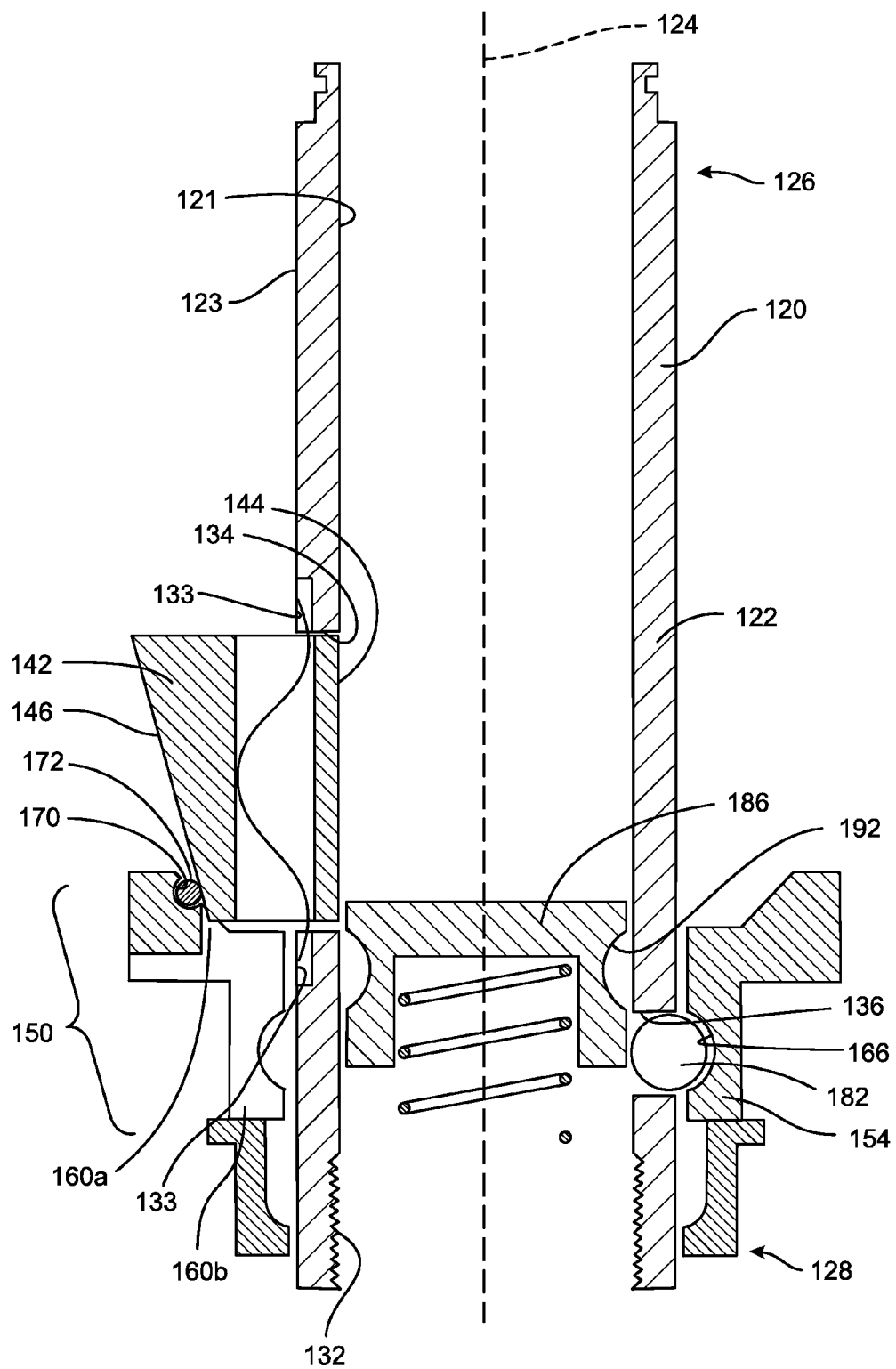
FIG. 16 depicts a side cross sectional view of some of the components of the quick change chuck of FIG. 11 in an unloaded configuration.
Figure 17:
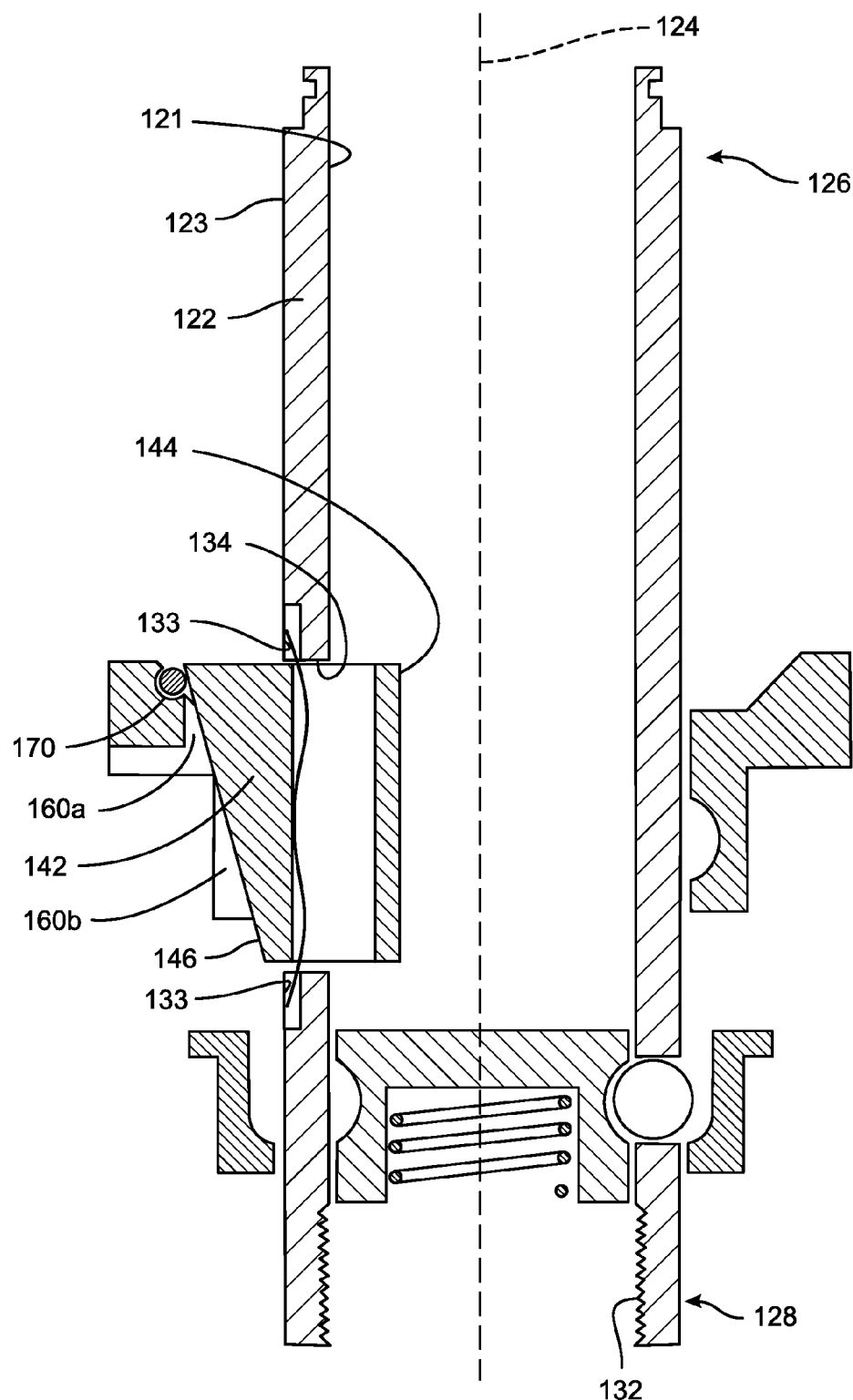
FIG. 17 depicts a side cross sectional view of some of the components of the quick change chuck of FIG. 11 in a loaded configuration.

As shown in FIGS. 16 and 17, the chuck body 120 further includes a chuck body threaded portion 132 formed on the surface of the bore 121 of the chuck body 120. The chuck body threaded portion 132 is formed at the lower portion 128 of the chuck body 120 and is configured to mate with the lower housing threaded portion 107 on the upward projection 106 (shown in FIG. 11) when the power tool chuck 110 is assembled as shown in FIGS. 18 and 19. The mating of the chuck body threaded portion 132 and the lower housing threaded portion 107 retains the lower housing 118 in a fixed position relative to the chuck body 120.

Also shown in FIGS. 18 and 19, the chuck body 120 further includes a lock washer 108 sized and configured such that it fits around the chuck body 120 in the second indentation 131b at the upper portion 126 of the chuck body 120. The lock washer 108 is also sized and configured such that it fits within the upper housing 116 above the inward projection 109. The relative sizes of the second indentation 131b, the lock washer 108 and the upper housing 116 are such that the lock washer 108 prevents upward movement of the upper housing 116 relative to the chuck body 120. Thus, the arrangement of the first indentation 131a and the second indentation 131b with the lock washer 108 with the inward projection 109 of the upper housing 116 prevents the upper housing 116 from moving upwardly or downwardly relative to the chuck body 120.

Returning to FIG. 12, the wall 122 of the chuck body 120 also includes a sidewall opening 136 in the form of a circular hole extending through the wall 122 to the bore 121 of the chuck body 120. The sidewall opening 136 is positioned in the lower portion 128 of the chuck body 120.

The claw assembly 140 includes at least one claw portion 142 and preferably includes a plurality of claw portions 142. The claw portions 142 are positioned equidistantly radially about the centerline 124. The claw portions 142 are configured to be received within and movable at least partially through the slots 134 in the wall 122 of the chuck body 120 such that the claw portions 142 are radially movable with respect to the centerline 124 of the chuck body 120.

Figure 13:
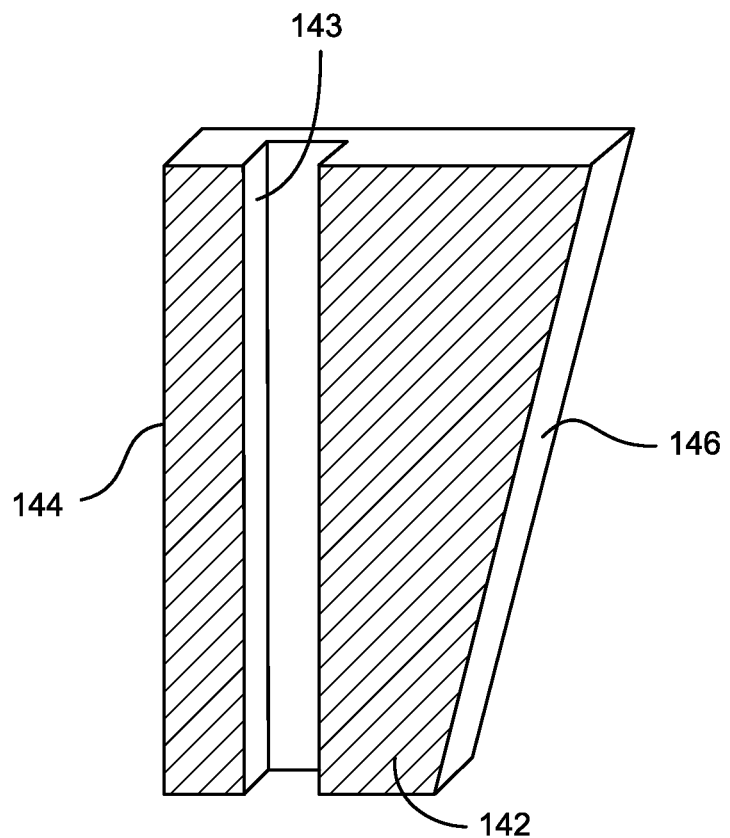
FIG. 13 depicts a side plan view of a claw portion of the quick change chuck of FIG. 11.

As shown in FIG. 13, the claw portions 142 include inner surfaces 144 generally parallel to the centerline 124 (when assembled as shown in FIGS. 18 and 19). When the claw portions 142 are inserted into the slots 134, as shown in FIGS. 16 and 17, the inner surfaces 144 face inwardly. Returning to FIG. 13, the claw portions 142 also include outer surfaces 146 opposite the inner surfaces 144. When the claw portions 142 are inserted in the slots 134, as shown in FIGS. 16 and 17, the outer surfaces 146 extend upwardly and outwardly such that the outer surfaces 146 are closer to the centerline 124 in the lower portion 128 and farther from the centerline near the upper portion 126 of the chuck body 120.

Returning to FIG. 13, the claw portions 142 include internal openings 143 extending through the claw portions 142 parallel to the inner surfaces 144. Each internal opening 143 is sized and configured to receive a leaf spring 141 (shown in FIGS. 16 and 17). The leaf spring 141 is sized and configured such that, when the claw portions 142 are inserted in the slots 134, as shown in FIGS. 16 and 17, the ends of the leaf spring 141 extend into the internal notches 133 in the wall 122 of the chuck body 120. Thus, the leaf springs 141 connect the claw portions 142 to the chuck body 120 and bias the claw portions 142 outwardly from the centerline 124.

Figure 14:
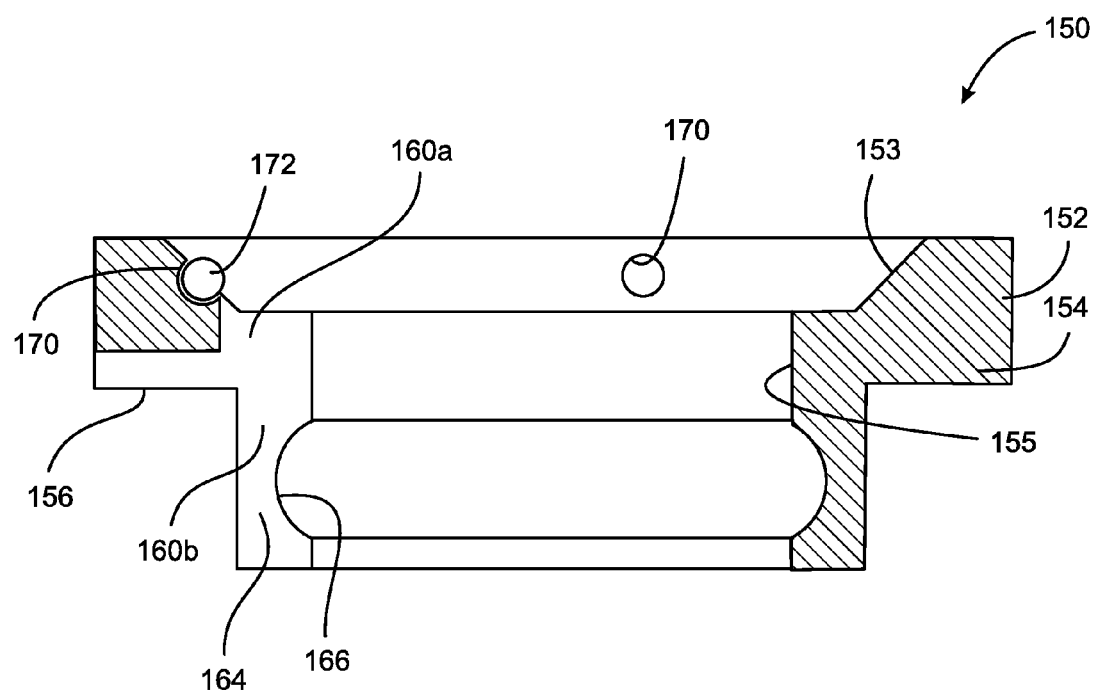
FIG. 14 depicts a side cross sectional view of the collar assembly of the quick change chuck of FIG. 11.

Shown in FIG. 14, the collar assembly 150 includes a top collar portion 152, a bottom collar portion 154 and balls 172. The collar assembly 150 is substantially ring shaped and configured to fit around the chuck body 120 (as best shown in FIGS. 18 and 19). The collar assembly 150 is axially movable with respect to the centerline 124 such that it moves between a lower position closer to the bottom portion 114 and an upper position closer to the top portion 112 of the power tool chuck 110.

Returning to FIG. 14, the top collar portion 152 defines an inner surface 153 which faces inwardly toward the chuck body 120. The top collar portion 152 includes recesses 160a formed on the inner surface 153. The recesses 160a are configured to align with the claw portions 142 of the claw assembly 140 as the claw assembly 140 protrudes outwardly through the slots 134 in the chuck body 120. Thus, the recesses 160a are configured to receive a portion of the claw portion 142 and the top collar portion 152 is configured to slide over the chuck body 120 even as the claw portions 142 protrude outwardly from the chuck body 120.

Referring again to FIG. 14, the bottom collar portion 154 defines an inner surface 155 facing the chuck body 120. The bottom collar portion 154 includes recesses 160b formed on the inner surface 155. The recesses 160b are configured to align with the claw portions 142 of the claw assembly 140 as the claw assembly 140 protrudes outwardly through the slots 134 in the chuck body. Thus, the recesses 160b are configured to receive a portion of the claw portion 142 and the bottom collar portion 154 is configured to slide over the chuck body 120 even as the claw portions 142 protrude outwardly from the chuck body 120. The bottom collar portion 154 also includes legs 164 extending downwardly from a bottom surface 156. The legs 164 include a curved indentation 166 formed on the inner surface 155. The curved indentation 166 is formed as a substantially semicircular curve open inwardly.

The top collar portion 152 includes ball retainer cavities 170 positioned on the inner surface 153. When assembled as shown in FIGS. 16 and 17, the ball retainer cavities 170 are aligned with the outer surfaces 146 of the claw portions 142 that are extending into the recesses 160a and 160b. The ball retainer cavities 170 are configured to retain the balls 172 such that the balls 172 contact the outer surfaces 146 of the claw portions 142.

Figure 15:
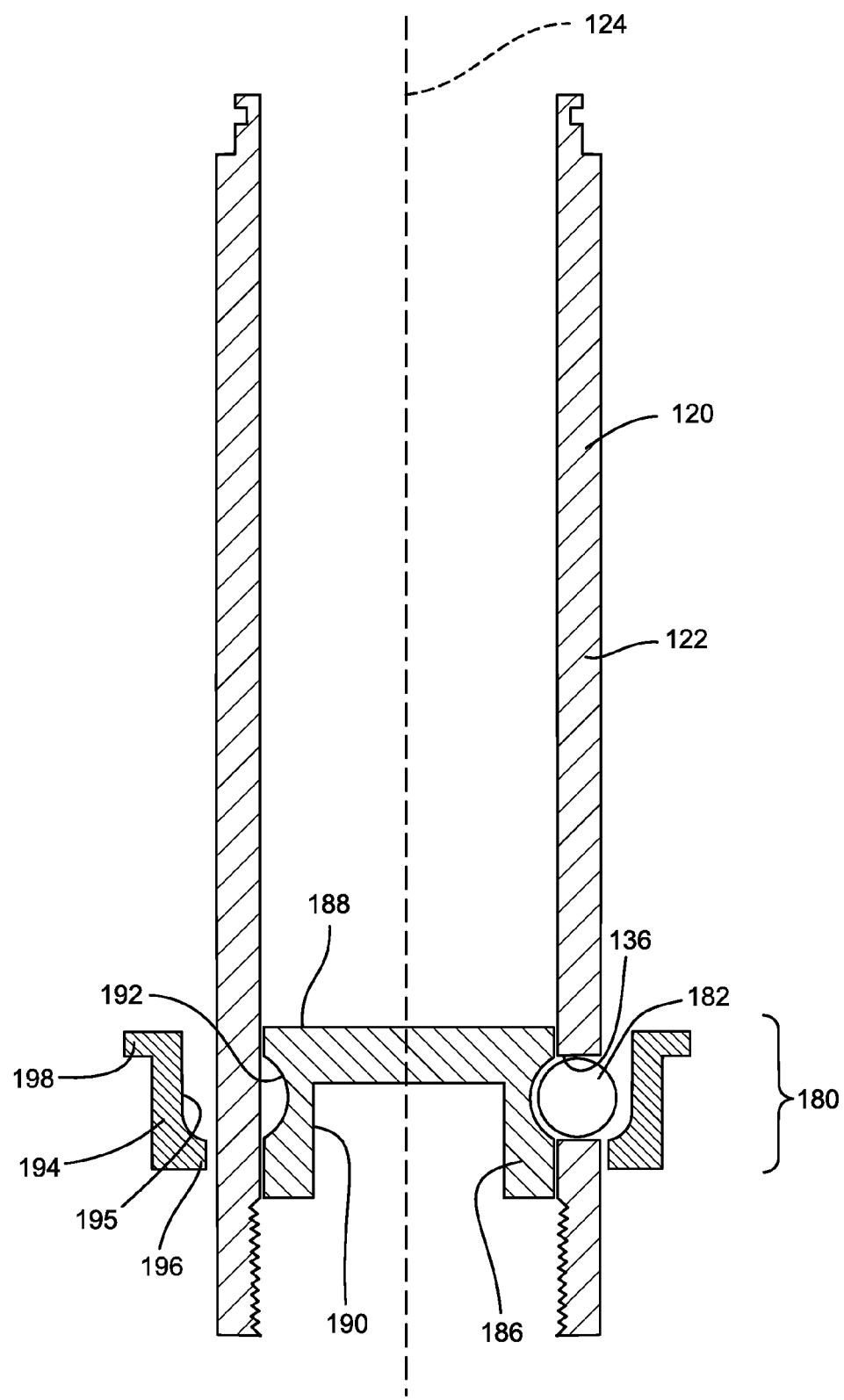
FIG. 15 depicts a side cross sectional view of the locking assembly of the quick change chuck of FIG. 11.

As shown in FIG. 15, the locking assembly 180 includes a locking member 182, an actuation member 186 and a locking member holder 194. The locking member 182 is positioned at least partially in the sidewall opening 136 of the chuck body 120. The actuation member 186 is positioned within and accessible through the bore 121 of the chuck body 120. The locking member holder 194 is positioned outside the chuck body 120.

The locking member 182 is configured to fit through the sidewall opening 136 defined in the wall 122 of the chuck body 120. The locking member 182 is sized and positioned, however, such that the locking member 182 cannot pass entirely through the wall 122 of the chuck body 120. Instead, a portion 184 of the locking member 182 is always within the sidewall opening 136. The locking member 182 is radially movable with respect to the centerline 124 between a position that is spaced apart from the centerline 124 and a position that is nearer to the centerline 124 as described more fully below.

The actuation member 186 may be in any desired from which will resist but not prevent movement resulting in the release of the locking member 182 from engagement with the curved indentation 166. In this embodiment, the actuation member 186 is configured in the form of a button and includes a top surface 188, a depression 190 and a trench 192. The top surface 188 faces upwardly and the actuation member 186 is operated by applying pressure to the top surface 188. The depression 190 is opposite the top surface 188 and faces downwardly. The trench 192 opens outwardly and faces away from the centerline 124 of the chuck body 120. The trench 192 may be in any desired form which will receive a portion 184 of the locking member 182. In this embodiment, the trench 192 is configured in the form of a concavity which extends inwardly into the actuation member 186 and continues around the entire actuation member 186.

The locking member holder 194 is substantially ring shaped and has an inner surface 195 configured to fit closely around the chuck body 120. The locking member holder 194 defines a projection 196 which extends from the inner surface 195. The locking member holder 194 is located below the collar assembly 150 such that it is closer to the bottom portion 114 of the power tool chuck 110. The locking member holder 194 includes a flange 198 extending radially outwardly from the locking member holder 194.

As shown in FIGS. 18 and 19, the power tool chuck 110 further includes a collar biasing member 200 configured to bias the collar assembly 150 upwardly toward the top portion 112 of the power tool chuck 110. The collar biasing member 200 is provided in the form of a spring located between the collar assembly 150 and the bottom portion 114 of the power tool chuck 110. The collar biasing member 200 is positioned around the chuck body 120 between the bottom portion 114 and the collar assembly 150 such that it contacts the bottom portion 114 of the power tool chuck 110 and the bottom surface 156 of the bottom collar portion 154 outside the legs 164. The collar biasing member 200 applies upward force on the collar assembly 150 and biases the collar assembly 150 upwardly toward the top portion 112 of the power tool chuck 110.

The power tool chuck 110 further includes a button biasing member 202 configured to bias the actuation member 186 upwardly toward the top portion 112 of the power tool chuck 110. The button biasing member 202 is provided in the form of a spring located between the actuation member 186 and the bottom portion 114 of the power tool chuck 110. The button biasing member 202 is positioned within the actuation member 186 between the bottom portion 114 and the actuation member 186 such that it contacts the bottom portion 114 of the power tool chuck 110 and the depression 190 in the actuation member 186. The button biasing member 202 applies upward force on the actuation member 186 to bias the actuation member 186 upwardly toward the top portion 112 of the power tool chuck 110.

The power tool chuck 110 further includes a holder biasing member 204 configured to bias the locking member holder 94 upwardly toward the top portion 112 of the power tool chuck 110. The holder biasing member 204 is provided in the form of a spring located between the locking member holder 194 and the bottom portion 114 of the power tool chuck 110. The holder biasing member 204 is positioned around the chuck body 120 but within the collar biasing member 200 between the bottom portion 114 and the locking member holder 194 such that it contacts the bottom portion 114 and the flange 198 on the locking member holder 194. The holder biasing member 204 applies upward force on the locking member holder 194 to bias the locking member holder 194 upwardly toward the top portion 112 of the power tool chuck 110.

The power tool chuck 110 further includes a housing biasing member 206 configured to bias the middle housing 117 upwardly toward the top portion 112 of the power tool chuck 110. The housing biasing member 206 is provided in the form of a spring located between the middle housing 117 and the lower housing 118. The housing biasing member 206 is positioned around the chuck body 120, the collar assembly 150 and the collar biasing member 200 such that it contacts the internal brim 125 on the middle housing 117 and the top of the lower housing 118. The housing biasing member 206 applies upward force on the internal brim 125 to bias the middle housing 117 upwardly toward the top portion 112 of the power tool chuck 110.

FIG. 18 is a cross sectional view of the power tool chuck 110 in an unloaded configuration, wherein the power tool chuck 110 does not have a tool or drill bit inserted into the chuck body 120. When the power tool chuck 110 is in an unloaded configuration, the button biasing member 202 is expanded upwardly and, thus, the actuation member 186 is in an upper position away from the bottom portion 114 of the power tool chuck 110. As shown in FIG. 16, the upper position of the actuation member 186 causes the trench 192 to be more upwardly positioned than the sidewall opening 136 in the wall 122 of the chuck body 120. Because the trench 192 is not aligned with the sidewall opening 136, the locking member 182 is not able to enter the trench 192 and is positioned such that is engages the curved indentation 166 of the bottom collar portion 154. The engagement of the locking member 182 with the curved indentation 166 prevents the collar assembly 150 from moving upwardly.

Returning to FIG. 18, because the locking member 182 prevents the collar assembly 150 from moving upwardly, the collar assembly 150 is in a lower position and the collar biasing member 200 is compressed between the bottom portion 114 of the power tool chuck 110 and the bottom surface 156 of the bottom collar portion 154. Additionally, because the collar assembly 150 is in the lower position, the locking member holder 194 is forced downwardly, compressing the holder biasing spring 204 between the bottom portion 114 of the power tool chuck 110 and the flange 198 of the locking member holder 194.

As noted above, the collar assembly 150 is positioned and configured to move between a lower position (shown in FIG. 18) and an upper position (shown in FIG. 19). The collar assembly 150 operably contacts the claw portions 142 as it moves axially along the chuck body 120 such that when the collar assembly 150 moves upwardly, the balls 172 retained in the ball retainer cavities 170 contact the outer surfaces 146 of the claw portions 142. Because the outer surfaces 146 of the claw portions 142 extend upwardly and outwardly, and because the collar assembly 150 has a fixed inner diameter, the collar assembly 150 forces the claw portions 142 inwardly from a position that is farther from the centerline 124 (shown in FIG. 16) toward a position that is nearer to the centerline 124 (shown in FIG. 17) as the collar assembly 150 moves upwardly.

Referring again to FIG. 16, because the collar assembly 150 is positioned near the bottom portion 114 when the power tool chuck 110 is in the unloaded configuration, the balls 172 in the ball retainer cavities 170 of the collar assembly 150 are positioned at the narrowest part of the claw portions 142 and thus do not force the claw portions 142 inwardly toward the centerline 124. Accordingly, the position of the collar assembly 150 when the power tool chuck 110 is in the unloaded configuration allows the claw portions 142 to move outwardly away from the centerline 124.

As shown in FIG. 18, when the power tool chuck 110 is in the unloaded configuration, and the claw portions 142 are free to move outwardly, the leaf spring 141 located in the internal opening 143 of each claw portion 142 biases the claw portions 142 outwardly. As the claw portions 142 move outwardly, each claw portion 142 contacts the internal brim 125 of the middle housing 117. The shape of the claw portions 142 forces the internal brim 125 to move downwardly as the claw portions 142 continue to move outwardly. The downward movement of the internal brim 125 forces the middle housing 117 downwardly and compresses the housing biasing member 206 between the internal brim 125 and the top of the lower housing 118.

The power tool chuck 110 transforms from the unloaded configuration to the loaded configuration (shown in FIGS. 17 and 19) upon insertion of a tool or drill bit into the chuck body 120 of the power tool chuck 110. As shown in FIG. 19, the tool or drill bit is inserted downwardly into the chuck body 120 until it contacts the actuation member 186 near the bottom portion 114 of the power tool chuck 110. The tool or drill but applies pressure to the actuation member 186 sufficient to overcome the force of the button biasing spring 202 such that the actuation member 186 is forced downwardly toward the bottom portion 114 of the power tool chuck 110 and the trench 192 becomes aligned with the sidewall opening 136 in the wall 122 of the chuck body 120.

The alignment of the trench 192 with the sidewall opening 136 allows the locking member 182 to move inwardly toward the centerline 124. The inward movement of the locking member 182 is aided by the shape of the curved indentation 166 in the collar assembly 150. The inward movement of the locking member 182 disengages the curved indentation 166 and allows the collar assembly 150 to move upwardly due to the force applied to the bottom surface 156 of the bottom collar portion 154 by the collar biasing member 200.

Upward movement of the collar assembly 150 frees the locking member holder 194 such that the holder biasing member 204 forces the locking member holder 194 upwardly toward the top portion 112 of the power tool chuck 110.

The upward force applied by the collar biasing member 200 is strong enough to overcome the outward force of the leaf spring 141. Thus, upward movement of the collar assembly 150 also forces the claw portions 142 inwardly through the slots 143 in the wall 122 of the chuck body 120 as the balls 172 contact the outer surfaces 146 of the claw portions 142 and the collar assembly 150 is forced upwardly along the external surface 123 of the chuck body 120 by the collar biasing member 200. The inward movement of the claw portions 142 frees the internal brim 125 to move upwardly as the upward force of the housing biasing member 206 is released.

Once the inner surfaces 144 of the claw portions 142 contact the drill or tool bit, the power tool chuck 110 is in the loaded configuration. The collar biasing member 200 maintains pressure on the claw portions 142 to retain the drill or tool but within the chuck body 120, and the holder biasing member 204 maintains pressure on the locking member holder 194 to retain the locking member 182 within the trench 192. Therefore, the collar biasing member 200 and the holder biasing member 204 keep the power tool chuck 110 in the loaded configuration.

To remove the drill or tool but from the power tool chuck 110, a user must apply downward force to the middle housing 117 of the power tool chuck 110. The force applied to the middle housing 117 will move the middle housing 117 downwardly relative to the chuck body 120. The internal brim 125 of the middle housing 117 will contact the collar assembly 150. The downward force applied to the middle housing 117 must be sufficient to overcome the upward forces of the housing biasing member 206, the collar biasing member 200 and the holder biasing member 204. Once the downward force applied to the middle housing 117 overcomes the upward force of the collar biasing member 200, the collar assembly 150 will move downwardly toward the bottom portion 114 of the power tool chuck 110. The downward movement of the collar assembly 150 frees the claw portions 142 to move outwardly. Once the collar assembly 150 contacts the locking member holder 194, the downward force applied to the middle housing 117 must overcome the upward force of the holder biasing member 204 as well as that of the collar biasing member 200. Forcing the collar assembly 150 downwardly such that the locking member holder 194 is forced past the sidewall opening 136 in the wall 122 of the chuck body 120 allows the curved indentation 166 to align with the sidewall opening 136 in the wall 122 of the chuck body 120. Alignment of the curved indentation 166 with the sidewall opening 136 allows the locking member 182 to move radially outwardly into the curved indentation 166 and out of the trench 192. The upward force applied on the actuation member 186 by the button biasing member 202 forces the actuation member 186 upwardly toward the top portion 112 of the power tool chuck 110 and aids movement of the locking member 182 out of the trench 192. The drill or tool bit is removed from the chuck body 120 and the power tool chuck 110 is thus returned to the unloaded configuration.

The foregoing detailed description of one or more embodiments of the quick change chuck has been presented herein by way of example. It will be recognized that there are advantages to certain individual features and functions described herein that may be obtained without incorporating other features and functions described herein. Moreover, it will be recognized that various alternatives, modifications, variations or improvements of the above-disclosed embodiments and other features and functions, or alternatives thereof, may be desirably combined into many other different embodiments, systems or applications. Presently unforeseen or unanticipated alternatives, modifications variations or improvements therein may be subsequently made by those skilled in the art which are also intended to be encompassed by the appended claims. Therefore, the spirit and scope of any appended claims should not be limited to the description of the embodiments contained herein.

What is claimed is:

1. A power tool chuck comprising:
at least one claw portion including an inner surface generally parallel to a centerline of the chuck and movable from a first position spaced apart from the centerline toward a second position located closer to the centerline;
a collar configured to move such that as the collar moves from a third position to a fourth position, the at least one claw portion is forced from the first position toward the second position such that the inner surface is forced against a shank positioned within the chuck;
a locking member movable between a fifth position whereat the locking member locks the collar in the third position and a sixth position whereat the locking member does not lock the collar in the third position;
a button axially aligned with the centerline and movable between a seventh position whereat the locking member is forced into the fifth position and an eighth position whereat the locking member is free to move into the sixth position; and
a ball holder movable between a ninth location whereat the ball holder impedes movement of the locking member from the sixth position toward the fifth position and a tenth location whereat the ball holder does not impede movement of the locking member from the sixth position toward the fifth position,
wherein the at least one claw portion is configured to clamp the shank toward the centerline via pressure applied by the inner surface to a surface of the shank that is substantially parallel to the inner surface.

2. The power tool of claim 1, wherein the collar comprises:
a lip configured to force the locking member from the fifth position toward the sixth position as the collar moves from the third position toward the fourth position.

3. The power tool chuck of claim 1, wherein:
the button comprises a notch; and
at least a portion of the locking member is located within the notch when the locking member is in the sixth position.

4. The power tool chuck of claim 1, further comprising:
a first biasing member configured to bias the collar toward the fourth position;
a second biasing member configured to bias the button toward the seventh position; and
a third biasing member configured to bias the ball holder toward the ninth position.

5. The power tool chuck of claim 4, wherein the third biasing member is interposed between the first biasing member and the centerline.

6. The power tool chuck of claim 1, wherein:
the at least one claw portion includes an outer surface extending upwardly and away from the centerline; and
the collar further comprises at least one ball retaining area configured to retain at least one ball therein such that the at least one ball is aligned with the outer surface.

7. The power tool chuck of claim 1, further comprising:
a chuck body defining the chuck centerline, the chuck body defining at least one slot configured to allow movement of the at least one claw portion between the first position and the second position.

8. The power tool chuck of claim 7, wherein:
the button is located within the chuck body;
the collar extends around the chuck body;
the chuck body defines a sidewall opening; and
the locking member is located at least partially within the sidewall opening.

9. The power tool chuck of claim 1, wherein:
the collar includes at least one ball arranged in direct contact with an outer surface of the at least one claw portion when the at least one claw portion is in the first position and when the at least one claw portion is in the second position, the at least one ball is configured to roll along the at least one claw portion such that as the collar moves from the third position to the fourth position, the at least one ball forces the at least one claw portion from the first position toward the second position.

10. The power tool chuck of claim 1, wherein:

the at least one claw portion includes an outer surface angled with respect to the centerline, and the outer surface is arranged directly radially outwardly of the inner surface of the at least one claw portion.

11. A power tool chuck comprising:

a claw assembly including at least one claw portion radially movable with respect to a centerline of the chuck;

a collar assembly operably contacting the at least one claw portion and axially movable along the centerline; and a locking assembly having a first configuration wherein the collar assembly is locked at a first location and a second configuration whereat the collar assembly is not locked at the first location, the locking assembly including an actuation member positioned within and accessible through the claw assembly and configured to at least partially receive a locking member, and a locking member holder configured to maintain the locking assembly in the second configuration by constraining movement of the locking member within the actuation member, wherein:

the locking member is arranged to contact the collar assembly when the locking assembly is in the first configuration and to contact the locking member holder when the locking assembly is in the second configuration.

12. The power tool chuck of claim 11, wherein:

the locking member holder is located axially downwardly from the collar assembly and is axially movable along the centerline.

13. The power tool chuck of claim 12, wherein the claw assembly further comprises a chuck body including:

a bit opening aligned with the centerline;

at least one slot, the at least one slot configured to allow movement of at least a portion of the at least one claw portion therethrough; and a sidewall opening, the sidewall opening configured to allow movement of a first portion of the locking member therein.

14. The power tool chuck of claim 13, wherein:

the at least one claw portion includes a lower portion and an upper portion;

the lower portion has a radial width that is less than the radial width of the upper portion; and the collar assembly includes at least one articulating member in contact with the at least one claw portion.

15. The power tool chuck of claim 14, wherein the locking assembly further comprises:

an actuation member positioned within the chuck body, the actuation member including a notch configured to receive at least a second portion of the locking member; and a second biasing member configured to bias the actuation member upwardly along the centerline.

16. The power tool chuck of claim 13, wherein the locking member holder is arranged farther from the bit opening than the collar assembly is from the bit opening.

17. The power tool chuck of claim 11, wherein:

the collar assembly includes at least one ball arranged in direct contact with an outer surface of the at least one claw portion when the at least one claw portion is in a first position spaced apart from the centerline and when the at least one claw portion is in a second position located closer to the centerline, and the at least one ball is configured to roll along the at least one claw portion such that as the collar assembly moves from a third position to a fourth position, the at least one ball forces the at least one claw portion from the first position toward the second position.

18. The power tool chuck of claim 11, wherein:

the at least one claw portion includes an inner surface generally parallel to the centerline and an outer surface angled with respect to the centerline, and the outer surface is arranged directly radially outwardly of the inner surface of the at least one claw portion.

19. The power tool chuck of claim 11, wherein axial movement of the collar assembly out of contact with the locking member enables axial movement of the locking member holder into contact with the locking member.

20. A power tool chuck comprising:

at least one claw portion including an inner surface generally parallel to a centerline of the chuck and movable from a first position spaced apart from the centerline toward a second position located closer to the centerline;

a collar configured to move such that as the collar moves from a third position to a fourth position, the at least one claw portion is forced from the first position toward the second position such that the inner surface is forced against a shank positioned within the chuck;

a locking member movable between a fifth position whereat the locking member locks the collar in the third position and a sixth position whereat the locking member does not lock the collar in the third position; and a button axially aligned with the centerline and movable between a seventh position whereat the locking member is forced into the fifth position and an eighth position whereat the locking member is free to move into the sixth position, wherein:

the at least one claw portion is configured to clamp the shank toward the centerline via pressure applied by the inner surface to a surface of the shank that is substantially parallel to the inner surface, the at least one claw portion includes an outer surface extending upwardly and away from the centerline, and the collar further comprises at least one ball retaining area configured to retain at least one ball therein such that the at least one ball is aligned with the outer surface.

\* \* \* \* \*